United States Patent [19]

Fukuda et al.

[11] Patent Number: 5,353,305
[45] Date of Patent: Oct. 4, 1994

[54] INITIAL TRAINING APPARATUS FOR USE IN A TRANSMITTER AND RECEIVER APPARATUS

[75] Inventors: Misao Fukuda, Tokyo; Shinji Ohta, Kawasaki; Seiji Miyoshi, Yokohama; Seiichi Yamato, Fukuoko; Kazuyoshi Maruyama, Yokohama; Yutaka Awata, Kawasaki; Kinji Kawada, Yokohama, all of Japan

[73] Assignee: Fujitsu Limited, Kawasaki, Japan

[21] Appl. No.: 465,225
[22] PCT Filed: Jun. 14, 1989
[86] PCT No.: PCT/JP89/00595
§ 371 Date: Feb. 14, 1990
§ 102(e) Date: Feb. 14, 1990
[87] PCT Pub. No.: WO89/12934
PCT Pub. Date: Dec. 28, 1989

[30] Foreign Application Priority Data

Jun. 17, 1988 [JP] Japan .................. 63-149373
Jun. 17, 1988 [JP] Japan .................. 63-149374

[51] Int. Cl.⁵ ............................ H03H 7/30
[52] U.S. Cl. ..................... 375/13; 370/32.1; 379/411
[58] Field of Search ............. 375/12, 13, 7, 98; 370/32.1; 379/411, 398, 402, 406, 410; 341/108, 145, 156, 165, 139; 333/18, 17.1; 331/18

[56] References Cited

U.S. PATENT DOCUMENTS

| | | | |
|---|---|---|---|
| 4,535,206 | 8/1985 | Falconer | 370/32.1 |
| 4,799,214 | 1/1989 | Kaku | 370/32.1 |
| 4,868,874 | 9/1989 | Takafori et al. | 370/32.1 X |
| 4,924,492 | 5/1990 | Gitlin et al. | 370/32 |

Primary Examiner—Tesfaldet Bocure
Attorney, Agent, or Firm—Staas & Halsey

[57] ABSTRACT

An initial gain of an automatic equalizer is fixed to a predetermined value. Then, the most appropriate gain of the automatic equalizer is determined when a training signal is received by the automatic equalizer. An echo replica signal produced by an echo canceler is multiplied by the value obtained by dividing the most appropriate gain by the initial gain. Thus, the echo replica signal is corrected to cancel the echo signal included in the output of the automatic equalizer. The sampling rate of the A/D converter used in the transmitter and receiver is shifted by a predetermined value from the transmission line rate at an initial training stage. Thereafter, the sampling rate of the A/D converter is determined to be near that of the transmission line.

32 Claims, 35 Drawing Sheets

INITIAL TRAINING APPARATUS FOR USE IN A TRANSMITTER AND RECEIVER APPARATUS

BACKGROUND OF THE INVENTION

1. Field of the Invention

The present invention relates to a transmitter and receiver apparatus (transceiver) and in particular relates to an initial training apparatus for use in an echo canceler transmission apparatus for correcting an echo signal in the best way by using an adaptive gain of an automatic equalizer.

2. Description of the Related Art

Equipment for transmitting and receiving signals is used to take advantage of the recently introduced bidirectional digital transmission method.

FIG. 1 shows a system structure based on digital subscriber line transmission. In FIG. 1, 1 designates a terminal apparatus provided within a subscriber's premises and 2 a transmission apparatus (transmitter). The subscriber's premises are connected to other transmission apparatuses in a station by a subscriber line 3, which is a two-wire metallic cable. This cable is used for bidirectional digital transmission, and provides a data capacity of 160 kb/s. A structural view of a transmission apparatus for a subscriber's premises is shown in FIGS. 2A and 2B. Generally, the transmission apparatus needs an automatic equalizer EQL to compensate for a waveform distortion on a transmission line.

Further, some transmission apparatuses include an echo canceler for suppressing echo leaking from a transmitted signal, and some do not. FIG. 2A shows a structural view of a transmitting apparatus based on a ping-pong transmission method, which does not use an echo canceler, and FIG. 2B shows a structural view of a transmission apparatus based on an echo cancelling transmission method, which does use an echo canceler. At present, a ping-pong transmission system is used in Japan and an echo cancelling transmission system is used in Europe and North America.

In the ping-pong transmission system, as illustrated in FIG. 2A, the data capacity for transmission is 160 kb/s, but as bidirectional transmission is used in a time divisional manner, the data capacity on subscriber line 3 is doubled, to 320 kb/s. Transmitting or receiving is switched by a transmitting and receiving switch SW. Transmission data is coded by a coding circuit, (coder) COD, and are driven by a line driver DRV. At this time a transmission switch SW selects a transmission site to transmit a signal on a subscriber line 3. On the other hand, a received signal transmitted from subscriber line 3 is selected by a transmitting and receiving switch SW, and then enters line equalizer EQL. Line equalizer EQL includes $\sqrt{F}$ AGC (automatic gain control) and automatically controls gain lost in a transmission line of a subscriber to automatically correct a gain matched with a frequency. The output of line equalizer EQL is applied to decoder DEC, thereby providing received data. In this case, timing reproducing circuit TIM reproduces a clock signal, namely, a synchronizing signal from a received signal and decodes the received data by using the clock. This ping-pong transmission method uses bidirectional signals on a transmission line in a time divisional manner. Thus, when transmission data are transmitted outwardly, they do not leak into the receiving side. Therefore, this system does not need an echo canceler. On the other hand, the data capacity of the transmission line becomes double the demanded data capacity of 160 kb/s, namely 320 kb/s. Therefore, a smaller hardware is required, but the transmission rate is lowered, so that there is a trade-off relationship.

FIG. 2B shows the structure of an echo canceler transmission system. Transmission data are coded by a coding circuit COD and are transmitted on subscriber line 3 through line driver DRV. In an echo canceler transmission system, data capacity of a transmission on subscriber line 3 is 160 kb/s and it does not perform bidirectional time divisional multiplexing. Then, transmitted and received signals are multiplexed in an analog manner. A received signal is inputted to hybrid circuit HYB i.e. a 2-wire/4-wire conversion circuit, from subscriber line 3. Where a transmission signal is transmitted on subscriber line 3 through hybrid circuit HYB, a part of it leaks as an echo, and is turned into its own apparatus on the receiving side. Therefore, in order to cancel an echo signal, an echo canceler EC is added. Echo canceler EC has, for example, a transversal filter structure. A pseudo echo (echo replica) is artificially formed as an impulse response to a transmitted signal. Coefficients of the transversal filter are determined by the echo signal, thereby producing the echo replica.

The echo replica is subtracted from the echo signal which leaks into the receiving side, thereby cancelling it. The received signal is thereby input into line equalizer EQL in which a gain for compensating a loss of a transmission line is automatically formed. The received signal is automatically multiplied by the gain, and the timing reproduction circuit extracts a synchronizing clock signal from it. A decoding circuit DEC decodes the received signal based on the synchronizing clock signal. This echo canceler transmission method needs an echo canceler and thus increases the volume of hardware. However, the transmission capacity of a subscriber line remains the same as that of the data capacitor, i.e. 160 kb/s. Thus, a time division multiplexing is not necessary for transmission. The transmission apparatus of an echo canceler transmission method includes a line equalizer and an AGC circuit to compensate for a waveform distortion on the transmission line and an echo canceler for suppressing leaking echoes of the transmitted signal. Before starting a normal data transmission, and upon an initial training in which a synchronization is established between transmitting and receiving sides, the gain and the coefficient of an echo canceler apparatus are determined. In other words, the initial training of the transmission apparatus comprises a training by an echo canceler and a training by an AGC. The performance of the transmission apparatus depends on how the initial training is conducted.

FIG. 3A shows the transmission apparatus which uses an echo canceler method. The apparatus includes the above automatic equalizer and echo canceler. The transmission apparatus comprises an echo canceler EC, automatic equalizer EQL, hybrid circuit HYB, subscriber line 3, a coding circuit COD and A/D converter A/D.

The apparatus shown in FIG. 3A performs an echo cancellation before automatic equalizer EQL. The apparatus shown in FIG. 3B relates to a method of performing an echo cancellation after the automatic equalizer EQL. The apparatus shown in FIG. 3C relates to a method of performing an echo cancellation both before and after the automatic equalizer EQL.

As shown in FIG. 3A, when an initial training is conducted, a pulse signal is transmitted from the apparatus to a transmission line through hybrid circuit HYB. This pulse signal trains an echo canceler EC, and an echo formed by a transmission pulse through a hybrid circuit is input to a subtraction circuit after it is subjected to A/D conversion. The coefficients of the EC is changed such that the difference between the output from the EC and the echo signal included in it decreases, thereby forming an echo replica. After the echo is canceled in this manner, equalizer EQL amplifies the received signal by the gain lost through the transmission line. If echo canceler EC and automatic equalizer EQL are all formed by an analog circuit, their control becomes difficult. Thus, in this structure, an A/D converter is provided at the output of hybrid circuit HYB. Therefore, various digital processes are conducted in a digital manner, and thus, the A/D converter must have about 13-bit accuracy. Therefore, the load on the digital circuit increases. After training of the echo canceler is completed, signals transmitted from another apparatus via the same circuit through a transmission line is received by hybrid circuit HYB, thereby enabling automatic equalizer EQL to be trained for a line equalization. After a predetermined time period, training of the automatic equalizer is completed. This method follows a rule that a training of echo canceler EC is conducted prior to that of automatic equalizer EQL.

On the other hand, when the apparatus shown in FIG. 3B is trained, an echo canceler is positioned after the automatic equalizer. This apparatus is suitable for a rule in which a gain training is first conducted by an automatic equalizer in a way similar to that described above and thereafter, an echo training is conducted by using the echo canceler. If this rule is followed, the amplitude of the echo signal is determined by the gain of the automatic equalizer, and this kind of echo canceler performs a better cancellation than that of the apparatus shown in FIG. 3A. However, this is not applied to a rule in which an echo canceler training is conducted prior to an automatic equalizer training.

The apparatus shown in FIG. 3C performs echo cancellation both before and after the automatic equalizer. In this case, the A/D converter is positioned after the automatic equalizer. Thus, conversion accuracy of the A/D converter can be decreased. Echo cancelling is conducted before the equalizer EQL through analog processing and an A/D converter of about 10 bit accuracy is sufficient, thereby decreasing the load on the digital circuit and facilitating manufacture of LSIs.

The transmission apparatus shown in FIG. 4 comprises a master-side transmission unit 10 and an opposite slave-side transmission unit 11, and respective units comprise source oscillators 12 and 13, whose oscillation frequencies are divided to determine the desired transmission speed.

An automatic equalizer provided within a transmission apparatus, as shown in FIG. 5, is known. The analog output of analog line equalizer 15, which produces a gain characteristic of a sufficient value upon receiving an input signal, is sampled and converted to a digital signal by A/D converter 16, thereby providing a sampled value $X_n$ of the received signal. Power arithmetic operation circuit 17 performs an arithmetic operation to produce an average value $E(X_n^2)$ of the power of a digitally sampled value Xn output from A/D converter 16. AGC circuit 18 performs an arithmetic operation to determine the most appropriate gain. The sampling frequency applied to A/D converter 16 can be obtained by the dividing clock frequency $f_m$ of source oscillators 12 and 13 (as shown in FIG. 4).

Therefore, AGC circuit 18 can determine the most appropriate adaptive gain after training.

The method shown in FIG. 3A is disadvantageous in that a residual echo, which cannot be canceled by echo canceler EC, is amplified by a filtering characteristic of the automatic equalizer EQL, so that it appears as the received signal, if the accuracy of the A/D converter is decreased. Therefore, in order to avoid the above defect, it is necessary to increase the accuracy of the A/D converter.

The methods disclosed in FIGS. 3B and 3C can achieve an echo cancellation of the output from the automatic equalizer EQL as the training of echoes is conducted after the training of equalizer EQL. However, in this method, the order of training is predetermined and if it is not satisfied, the most appropriate training cannot be conducted, under a rule that the training of equalizer EQL is conducted after the training of echoes.

In FIG. 3C, the echo cancelers are provided before and after the equalizer EQL. However, the echo canceler provided after the equalizer EQL cannot conduct the training of the echo canceler before that of the equalizer EQL. In other words, the echo canceler is used under a rule that the training of the equalizer is conducted prior to that of the echo canceler.

Such initial training of an automatic equalizer is conducted at the beginning of the initial training of a transmission apparatus, and in most cases when timing (phase) data of a received signal has not yet been obtained.

In order to perform AGC training during a period when timing data does not exist, it is necessary to perform an A/D conversion of a received signal at a sampling frequency $Nxf_s$ which is more than twice the received signal frequency $f_s$ (transmission rate).

The great barrier is that the automatic equalizer installed with the A/D converter has a high sampling frequency and is made of LSIs. This inhibits the development of an inexpensive, compact and highly reliable transmission apparatus. The transmission speed increases with the expansion in transmission capacity, as has been observed recently. This is a further difficulty.

SUMMARY OF THE INVENTION

Therefore, the present invention is aimed at performing an initial training which is independent of the training of the transmission apparatus, or the communication apparatus, in which an echo canceler is positioned after the automatic equalizer and particularly aimed at conducting the most appropriate training even under a rule that the training of the echo canceler is performed prior to that of the equalizer EQL.

The present invention is aimed at providing an initial training method for an automatic equalizer installed with an A/D converter having a low sampling speed, which is suitable for LSIs.

An initial training apparatus for a communication apparatus of the present invention is shown in FIG. 6, and is explained by referring to the training sequence shown in FIG. 7.

FIG. 6 shows the principle of the present invention. In the drawing, 21 is an echo canceler, 22 is an automatic equalizer, 23 is a gain correcting unit, 24 is a multiplier, and 25 is a subtractor.

According to the present invention, first the output of a gain corrector 23, namely the gain, is set at the unity gain, or 1, and the gain of the automatic equalizer is set at $G_I$ even under a rule that the echo canceler is provided after the equalizer and that the training of echo canceler is conducted prior to that of the equalizer. A pulse is transmitted as a training signal to perform the training of echo canceler, the adaptive gain $G_F$ of the returned received signal is obtained by an automatic equalizer, and $G_F$ is input to the gain correcting circuit 23. Echo canceler 21 outputs an echo replica of the training signal. The output of the echo canceler 21 is multiplied by the unity gain "1" at the first training, and the echo canceler 21 performs a training such that the difference between the echo replica and leaking echo, i.e. the output from automatic equalizer 22, is decreased. The adaptive gain $G_F$ is obtained by gain correcting circuit 23 by dividing $G_F$ by $G_I$. For example, the echo replica is multiplied by $G_F/G_I$, thereby performing another echo cancellation. The present invention fixes an initial gain $G_I$ of automatic equalizer 22 and trains echo canceler 21 by using the transmitting training signal. It performs a training of automatic equalizer 22 by using the received training signal to produce the adaptive gain $G_F$, and corrects the amplitude of echo replica ER from echo canceler 21 upon communication, by using results obtained by comparing the adaptive gain $G_F$ with the initial gain $G_I$. Even if the echo canceler is provided after the equalizer, the present invention is suitable for a rule under the condition that the training of the echo canceler is conducted prior to that of the equalizer.

It is also preferable that sampling frequency of an A/D converter installed in an automatic equalizer which is suitable for an LSI is about the transmission path rate.

However, when the sampling frequency is equal to the transmission speed, it is not determined at which point in period T a sampling is performed. Thus, the result of an arithmetic operation of a power is either close to 0 or large.

Therefore, according to the initial training method using the automatic equalizer of the present invention, the sampling frequency of the A/D converter is made to correspond with the transmission speed, or the communication frequency, $f_s$, and the initial training is set to the frequency $f_s \pm \Delta$, obtained by changing frequency $f_s$ by a predetermined value and on completion of a training, the sampling (transmission) frequency is used.

By transmitting a training signal to a transmission line, a training of echo canceler 21 is performed, where echo canceler is trained before the equalizer, even if the echo canceler is provided after the equalizer. In this case, automatic equalizer 22 is positioned before echo canceler 21, and thus the gain of automatic equalizer 22 is fixed at an initial gain $G_I$.

When a training of echo canceler 22 is completed as explained above, a training of automatic equalizer 22 is performed by using a training signal received from another apparatus.

Thereafter, the transmission apparatus moves to an ordinary communication operation, and at this time, a echo replica ER, produced by echo canceler 21 to perform an echo cancellation, is corrected by the result obtained by comparing the adaptive gain $G_F$ with the initial gain $G_I$, namely, the value obtained by dividing $G_F$ by $G_I$.

As described above, echo canceler 21 performs a training using an initial gain GI. Even if automatic equalizer 22 is positioned before echo canceler 21, a training can be conducted in the order of cancellation of echo canceler 21 and then equalization of automatic equalizer 22.

When a training is conducted in the order of equalization of automatic equalizer 22 and then cancellation of echo canceler 21 in the same manner as in the prior art, it can be done in the same manner as in the apparatus shown in FIG. 3B, thereby utilizing no initial gain correction of the echo replica.

Therefore, an initial training of a transmission apparatus can be realized regardless of the training sequence.

According to another feature of the present invention, the sampling frequency is intentionally shifted by a predetermined value $\Delta$ to provide a frequency $f_S \pm \Delta$ and this sampling clock is made to run by a timing reproduction circuit in the following stage, thereby scanning a received signal and enabling an AGC to be applied.

DESCRIPTION OF THE PREFERRED EMBODIMENTS

An embodiment of the present invention will be explained by referring to the attached drawings.

Figure 8:
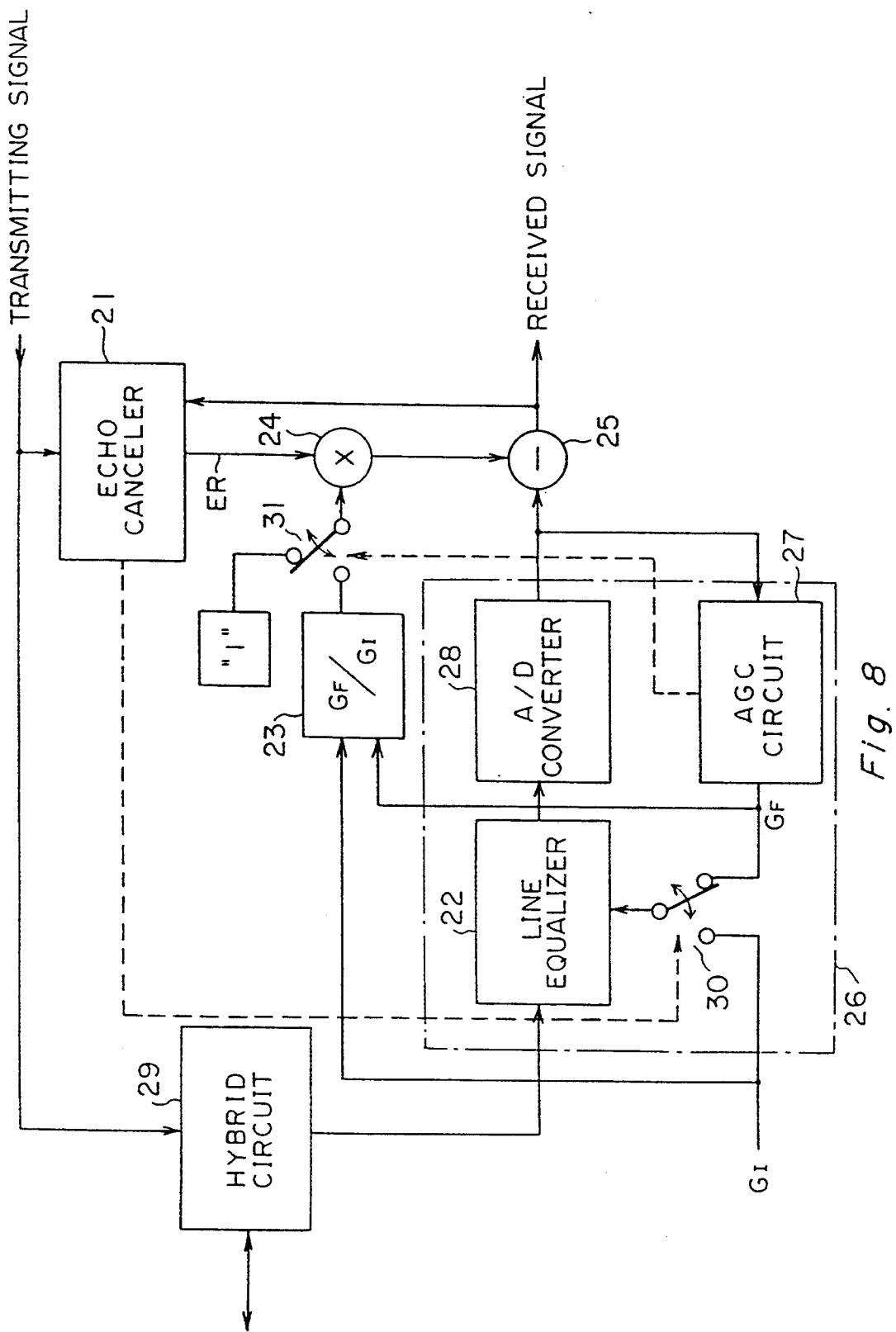
FIG. 8 shows a block diagram of an embodiment of the present invention.

FIG. 8 shows an embodiment of an initial training apparatus for use in a communication apparatus. 21 represents an echo canceler; 26 is an automatic equalizer comprising a line equalizer 22, AGC circuit 27 and A/D converter 28; 29 is a hybrid circuit; 30 is a switch for switching the fixed initial gain $G_I$ and the most adaptive gain $G_F$ obtained by an arithmetic operation by AGC circuit 27; 23 is a gain correcting circuit for obtaining a ratio of the adaptive gain $G_F$ to initial gain $G_I$; 31 is a switch for selecting either of the outputs from the gain correcting circuit or gain "1"; 24 is a multiplier for multiplying an echo replica ER produced by echo canceler 21 by switch 31; and 25 is a subtractor.

Automatic equalizer 26 receives a received signal, converts it to a digital signal, calculates the power of the digital signal, calculates the adaptive gain by AGC circuit 27 based on this power, and amplifies the received signal by using the gain of line equalizer 22. As described above, in the present invention, the echo canceler is provided after the equalizer to decrease the number of bits of the A/D converter, performing the most appropriate initial training under a rule that the training of the echo canceler is conducted prior to that of the equalizer.

An operation of this embodiment is explained.

1. At first, switch 30 is switched to the side of initial gain $G_I$ for a training of echo canceler 21, and switch 31 for correcting an echo replica ER is switched to the non-correction side (1). Thus, the gain of line equalizer 22 is fixed at $G_I$.

2. An echo replica ER produced by echo canceler 21 is arithmetically operated on by a training signal which is transmitted from the home or originating apparatus, and a tap coefficient (not shown) for producing the most appropriate echo replica is held within echo canceler 21. This completes a preliminary training of echo canceler 21.

3. Next, switch 30 is switched to the side of AGC circuit 27. Therefore, AGC circuit 27 performs an AGC operation to obtain the adaptive gain which is most appropriate.

4. AGC circuit 27 arithmetically determines the adaptive gain $G_F$ within a predetermined training period. By using a training signal received from another apparatus. AGC circuit provides line equalizer 22 with the adaptive gain $G_F$ and maintains the adaptive gain $G_F$. Thus, a training of AGC circuit 27 is completed.

5. The adaptive gain $G_F$ held in AGC circuit 27, and initial gain $G_I$, are transmitted to gain correcting circuit 23, and the ratio $G_F/G_I$ is calculated.

6. Finally, switch 31 is switched back to the side of gain correcting circuit 23 to prepare it for correcting an echo replica ER produced by echo canceler 21.

7. As described above, when training is completed, the system enters the communication state. Multiplying unit 24 multiplies an echo replica ER output from echo canceler 21 by the ratio output from gain correcting unit 23, thereby correcting echo replica ER output from echo canceler 21, and completing a preliminary training.

If $G_I > G_F$, echo replica ER is decreased.

Switching of switch 30 is conducted upon completion of a training of echo canceler 21 and a switching of switch 31 is conducted upon completion of a training of AGC circuit 27. These switches 30 and 31 are operated automatically.

Figure 9:
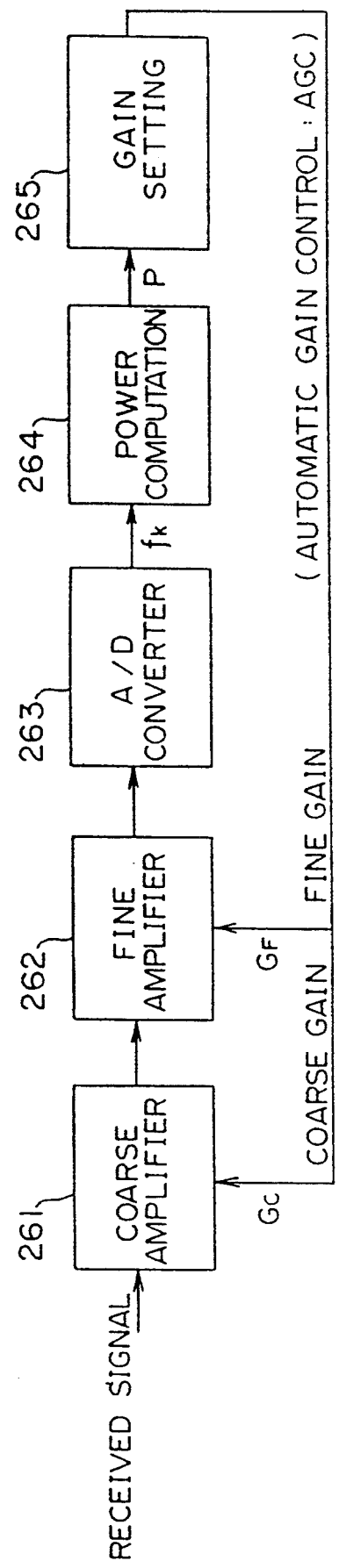
FIG. 9 is a block diagram of the automatic gain controller shown in FIG. 8, according to an embodiment of the present invention.

FIG. 9 shows the structure of automatic equalizer 26. 261 shows a coarse amplifier, 262 a fine amplifier, 263 an A/D converter, 264 a power computation unit and 265 a gain setting unit.

Figure 10:
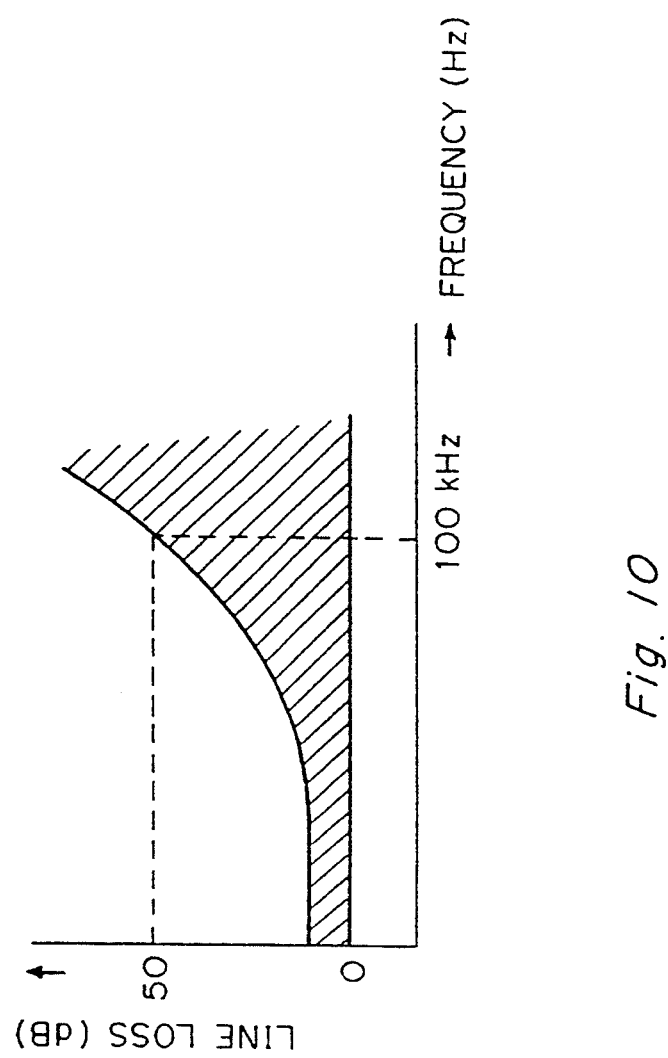
FIG. 10 shows a characteristic graph of a subscriber line showing the relationship between line loss and frequency.
Figure 11:
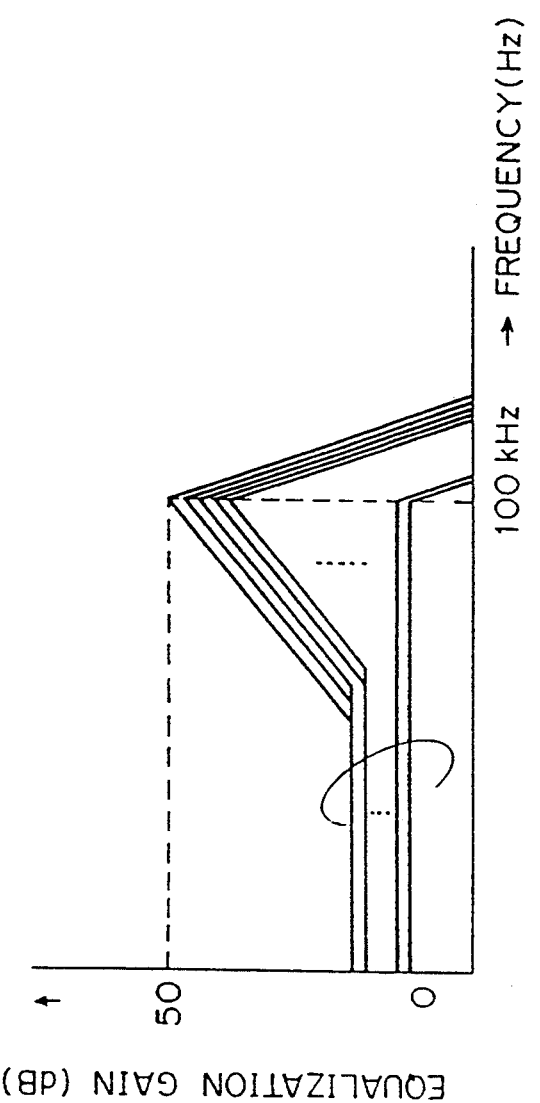
FIG. 11 shows frequency characteristics of the gain of the $\sqrt{f}$ AGC equalizer.

Line equalizer 22 compensates for line loss in a subscriber line of a received signal and performs a waveforming i.e. equalization of the received signal. FIG. 10 shows a line characteristic of a subscriber line. As shown, when frequency increases, line loss increases in proportion to $\sqrt{f}$. For example, at 100 KHz line loss is 50 dB. Thus, if the opposite apparatus transmits a signal of 100 KHz, there is a loss of 50 dB at the receiving end, which deteriorates the waveform. In order to compensate for this deterioration and to perform a waveforming on the received signal it is necessary to amplify the received signal by 50 dB at 100 KHz. This is conducted by coarse amplifier 261 and fine amplifier 262 in the line equalizer shown in FIG. 9. Coarse amplifier 261 shows slope gain characteristics and flat gain characteristics, and fine amplifier 262 shows flat gain characteristics. In order to determine the gain of respective amplifiers 261 and 262, the power of the received signal is calculated. Therefore, when the signal is received, it is input to A/D converter 263 through amplifiers 261 and 262, and a power calculation is conducted by digital power computation unit 264 on the output of the A/D converter 263. Gain setting unit 265 determines the gain based on the power calculation. Namely, an automatic gain control circuit, i.e. AGC circuit 27, controls the gain automatically by using power computation unit 264 and gain setting unit 265. Gain setting unit 265 contains a table representing a relationship between the power values and control signals used for switching of the switch which automatically selects a gain corresponding to the power. Coarse amplifier 261 has a slope gain characteristic in which gain varies with frequency. Fine amplifier 262 has a flat gain characteristic in which gain is independent of frequency. First, coarse amplifier 261 performs a coarse control of the input signal. Then fine amplifier 262, which has a flat gain characteristic, performs a precise adjustment. A frequency characteristic, i.e. $\sqrt{f}$ AGC equalizer gain frequency characteristic, which is obtained by these amplifiers 261 and 262, is shown in FIG. 10. Equalization gain curves, expressed in units of dB, are plotted against frequency in FIG. 11. The frequency characteristic shown in FIG. 11 has a form in which the subscriber line characteristic shown in FIG. 10, i.e. a line loss increased in proportion to $\sqrt{f}$, is compensated for. Namely, $\sqrt{f}$ AGC equalizer gain frequency characteristic shown in FIG. 11 is provided to compensate for line loss. If a loss of 520 dB occurs in a 100 KHz-signal as shown in FIG. 10, an equalization gain of about 50 dB is provided as shown in FIG. 11. In other words, the frequency characteristic of FIG. 10 is opposite to that of FIG. 11. To enable the adaptive frequency characteristic to be selected, 16 equalization gain characteristic curves from 0 to 15 are provided. The adaptive curve is selected from the result of an AGC circuit.

Figure 12A:
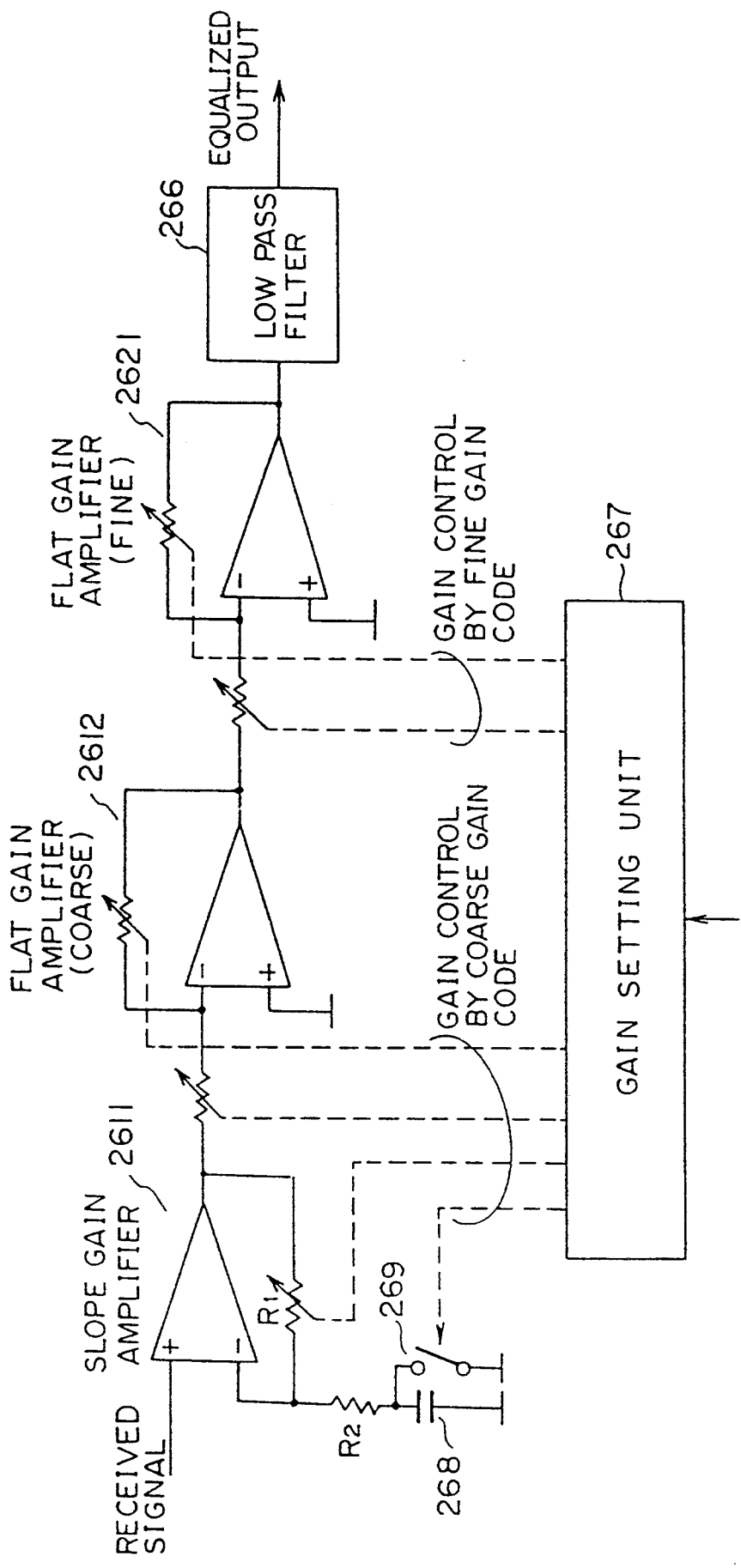
FIG. 12A shows a circuit construction of the $\sqrt{f}$ equalizer.

FIG. 12A shows a circuit diagram of the $\sqrt{f}$ equalizer. 2611 is a slope gain amplifier, 2612 is a flat gain amplifier for a coarse control, 2621 is a flat gain amplifier for fine control, 266 is a low pass filter, and 267 is a gain determining unit (decoder). Slope gain amplifier 2611 is a positive phase amplifier for receiving a received signal when switch 269 in parallel with capacitor 268 is turned off. The amplifier 2611 then becomes a high-pass filter because of the influence of capacitor 268.

Figure 12B:
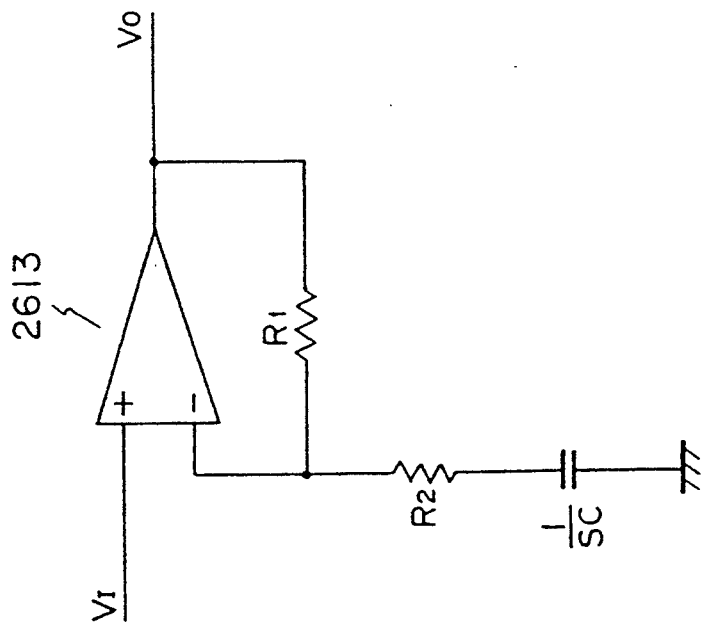
FIGS. 12B and 12C show basic diagrams of the amplifiers used in the $\sqrt{f}$ equalizer shown in FIG. 12A.

FIG. 12B shows a high-pass filter portion extracted from slope gain amplifier 2611. 2613 is a differential amplifier which is ideally controlled such that the input signals applied to plus and minus terminals are controlled to have the same voltage value. The input impedance of the differential amplifier 2613 is infinite. If the input is $V_I$ and the output is $V_O$, the voltage at the minus terminal is obtained as follows.

$$V_O \times (R2+1/SC)/(R1+R2+1/SC) = V_I \quad (1)$$

Therefore, $$V_O = (R1+R2+1/SC) \times V_I/(R2+1/SC) \quad (2)$$

Laplace parameter S corresponds to frequency, and when frequency increases, the output $V_O$ becomes $(R1+R2) \times V_I/R2$. When frequency is 0, namely, when direct current flows, $V_O = V_I$, and the circuit becomes a unity gain amplifier. As $(R1+R2)/R2$ is larger than 1, the gain of the transmission function varies from 1 to $(R1+R2)/R2$, thereby providing a positive slope gain. Selection of a slope designating a gain characteristic, as shown in FIG. 11, is controlled by gain setting unit 265, by changing the value of feed-back resistor R1 in FIG. 12A. If the frequency characteristic has zero slope, namely, it is flat, switch 269 connected in parallel with a capacitor 268 is turned on, thereby enabling a slope gain amplifier 2611 to operate as a positive amplifier.

Coarse plane gain amplifier 2612 is a amplifier for providing a coarse gain. This amplifier has a type of reversed phase and the input signal is multiplied by the value (feed-back resistance/input resistance) and is reversed, thereby providing the output. The gain control of a coarse gain code is conducted by gain setting unit 265. In this case, change in the number of multiplications is determined by a coarse control, and the gain can be changed in 3 dB steps. A flat characteristic of a fine amplifier 2621 is structurally similar to that of a coarse amplifier 2612, and gain can be changed in 0.2 dB steps, thereby providing a fine gain characteristic.

Figure 12C:
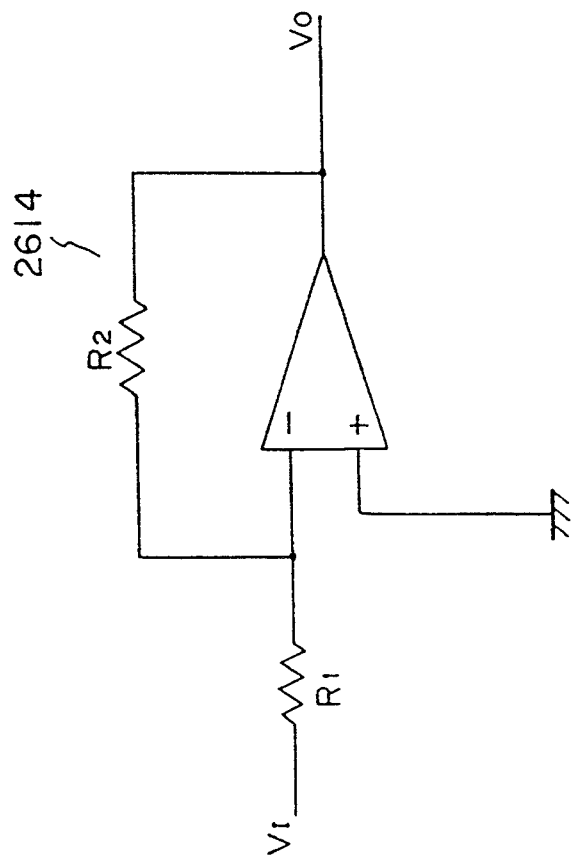

FIG. 12C shows the principle of the flat gain amplifier. If differential amplifier 2614 is ideal, the current flowing through resistor R1 is the same as that through resistor R2 and the voltage at the minus terminal is equal to that at the plus terminal and thus, at the minus terminal it is imaginary zero. Therefore, the current flowing through resistor R1 is $V_I/R1$ for input voltage $V_I$. This is equal to the current flowing through R2, namely, the current obtained by dividing minus $V_O$ by R2. Therefore, the output $V_O$ is expressed as follows:

$$V_O = -(R2/R1) V_I \quad (3)$$

The value of the input side resistor R1 and feed-back resistor R2 is selected by gain setting unit 265. Thus, it is possible to obtain a flat gain.

Figure 13:
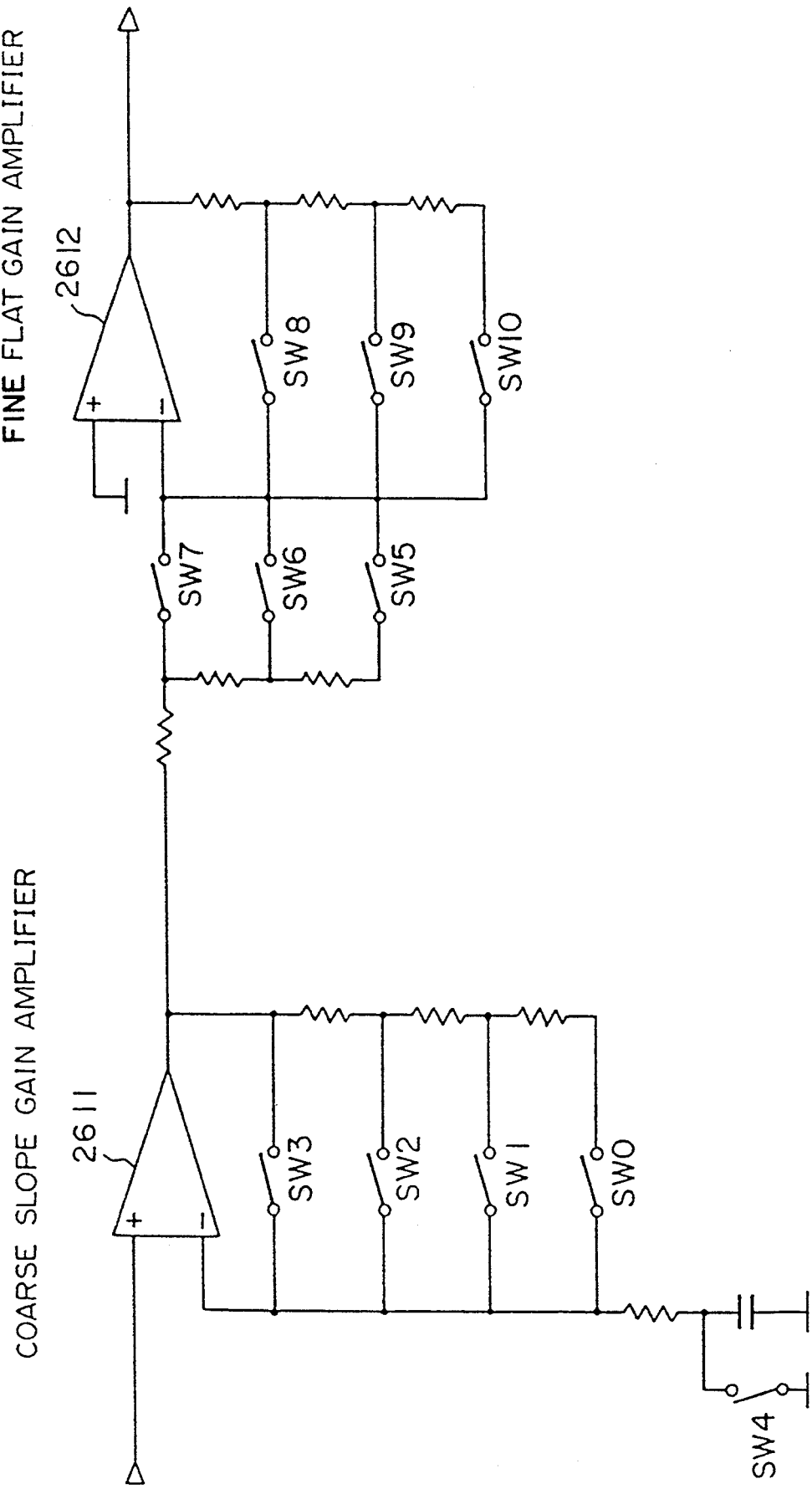
FIG. 13 is a circuit diagram of the line equalizer.

FIG. 13 shows a circuit diagram of a *f equalizer and a gain setting unit. In the drawing, 2611 is a coarse slope gain amplifier and 2612 is a coarse flat gain amplifier. SW0 to SW10 indicate switches, whose on and off positions are controlled by a gain setting unit. SW4 is for controlling whether or not the slope of the coarse slope gain amplifier 2611 should be provided, and switches SW0 to SW3 select a feed-back register in FIG. 12B. If switch SW0 is turned on, and switches SW1, SW2 and SW3 are turned off, then three resistors are connected in series to be fed back, thereby providing a large feed-back resistance. If only switch SW1 is turned on, the feed-back resistance comprises the value of two serial resistors.

On the other hand, coarse flat gain amplifier has switches SW5, SW6 and SW7 to select the value of input side resistance R1 in FIG. 12C, and switches SW8, SW9 and SW10 to select feed-back resistance R2. If switch SW5 is turned on, and SW6 and SW7 are turned off, the two resistors on the left side are connected in series to an imaginary ground. If switch SW10 is turned on and SW9 and SW8 are off, a feed-back resistor is connected to the output end minus terminal, namely imaginary ground, such that the three resistors on the right side are connected in series. These switches are selected by a code. If the coarse gain code is 8, switches SW1, SW4, SW6 and SW9 are turned on and the others are turned off.

Figure 14:
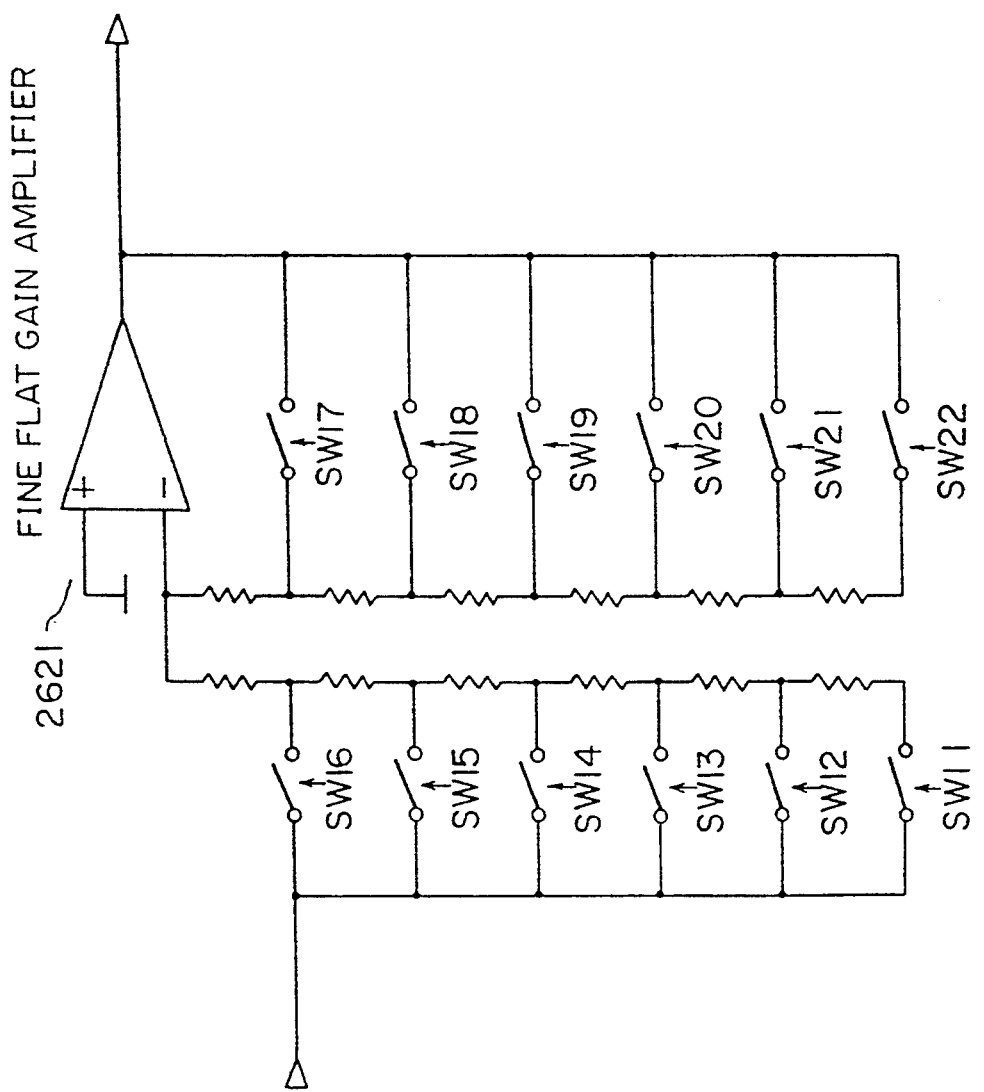
FIG. 14 is a circuit diagram of a fine plane gain amplifier.

FIG. 14 shows a circuit diagram of a fine flat gain amplifier 2621 and an embodiment including a gain-setting unit. Its structure is the same as that of the coarse average gain adjustment amplifier. This drawing is similar to FIG. 12C and input side resistance R1 and feed-back resistance R2 are selected by a switch. Switches SW11 to SW16 determine the input side resistance and switches SW17 to SW22 determine the output side resistance. If, for example, the fine gain code is 8, switches SW12 and SW18 are turned on and the others are turned off. Therefore, the input side resistance comprises 5 fixed resistors connected in series, and the feed-back resistance comprises two resistors connected in series.

Figure 15:
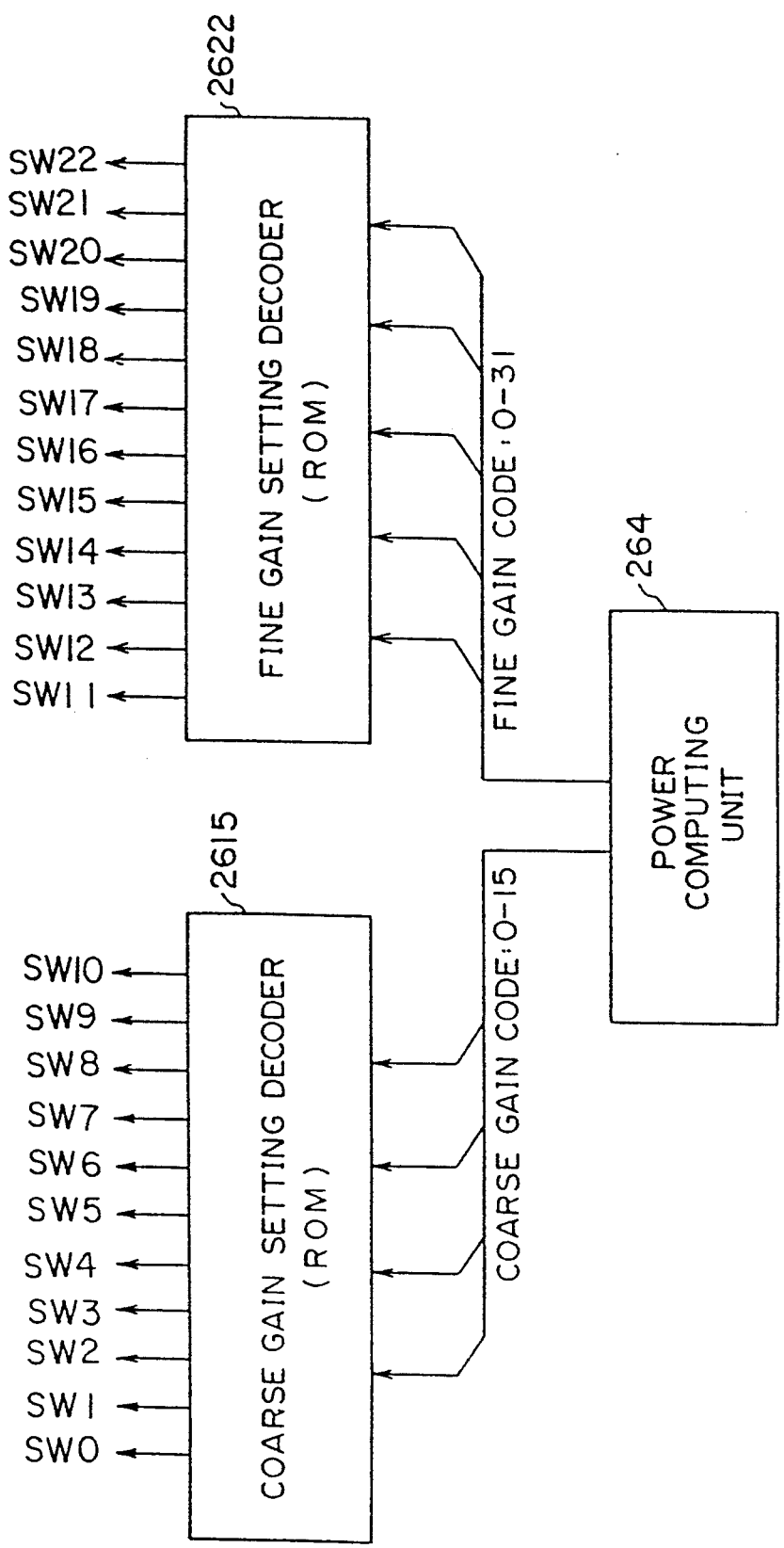
FIG. 15 is a circuit diagram of the gain setting unit in FIG. 12A.

FIG. 15 is a block diagram of a gain setting unit and a power computing unit 264. When the output from a coarse amplifier and fine amplifier are subjected to an A/D conversion, the power computing unit computes the power of the input signal. The value of the power sets the gain of the coarse amplifier and the fine amplifier, thereby providing a coarse gain setting decoder 2615 and a fine gain setting decoder 2622 (both composed of ROM). The number of coarse gain codes is 16, namely, 0 to 15, and the number of fine gain codes is 32, namely, 0 to 31. The output of the power computing unit 264 selects one of the coarse gain codes to obtain the result of a power computation, and selects one of the 32 fine gain codes by using a control signal for switching control corresponding to a given coarse gain code stored in ROM. For example, when the coarse gain code is 8, switches SW1, SW4, SW6 and SW9 corresponding to coarse amplifiers are turned on and the others are turned off, and these switching operations are controlled by ROM. When a switch is on, it is deemed "1" and when it is off it is deemed "0". ROM sends appropriate 0/1 switch control signals to the coarse slope gain amplifier shown in FIG. 13, thus controlling on and off switching of the switches. Similarly, a fine gain setting decoder outputs a switching pattern corresponding to a fine gain code. For example, for a coarse gain code of 8, switches SW12 and SW18 are turned on and a control signal corresponding to switches SW12 and SW18 are turned to "1" and the other switches are turned to "0". These signals constitute a switch control signal for the fine flat gain amplifier shown in FIG. 14.

Figure 16:
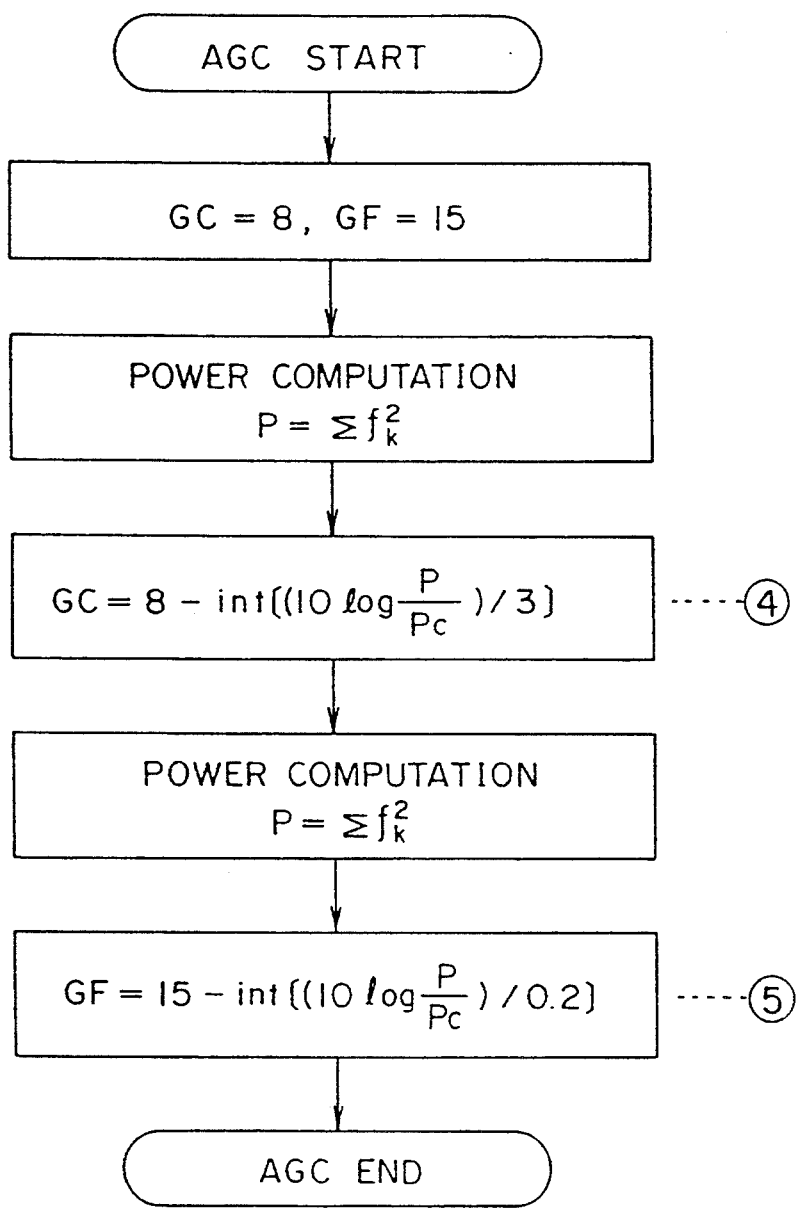
FIG. 16 shows a flow chart of an operation of a $\sqrt{f}$ AGC.

FIG. 16 shows a flow chart for an automatic gain control circuit for setting a gain. GC is a coarse gain code, GF is a fine gain code, and Pc is a target power. When the automatic gain control flow starts, the initial values are set at GC=8 and GF=15, and the power calculation is started in accordance with equation (4) in FIG. 16. Power is obtained by averaging the square of the signal output from the A/D converter for one period. The ratio of the result of the power computation P to the target power Pc is also obtained. This ratio is expressed in decibels to provide a value which is divided by 3. The integer portion of this value is subtracted from 8 to provide GC in accordance with equation (4). Coarse gain code GC is then output. A similar power calculation is conducted to provide fine gain codes in accordance with equation (5) in FIG. 16. When a fine gain code is produced, the result of the power computation is divided by a target power Pc and converted to decibels. This value is divided by 0.2 and the integer portion of the divided result is subtracted from 15. Thus, the AGC is completed.

In order to set an initial gain of $\sqrt{f}$ AGC, for example, GC=8 and GF=15, a power calculation is conducted. The difference between the obtained power P and the target power Pc is calculated in decibels and converted to a coarse amplifier code which can be varied in 3 dB steps, or a fine amplifier code which can be varied in 0.2 dB steps. Calculations such as (4) and (5) are conducted by a so-called DSP (Data Signal Processor) but it is difficult to perform a processing in real time. Therefore, a following counter-measure is considered.

For example, in order to obtain a coarse amplifier code, the following values should be included in the table in accordance with the following equation, $$P_R(I) = P_C \cdot 10^{(3I - 1.5)}$$

where I = −7 to 8.

Figures 17A, 17B:
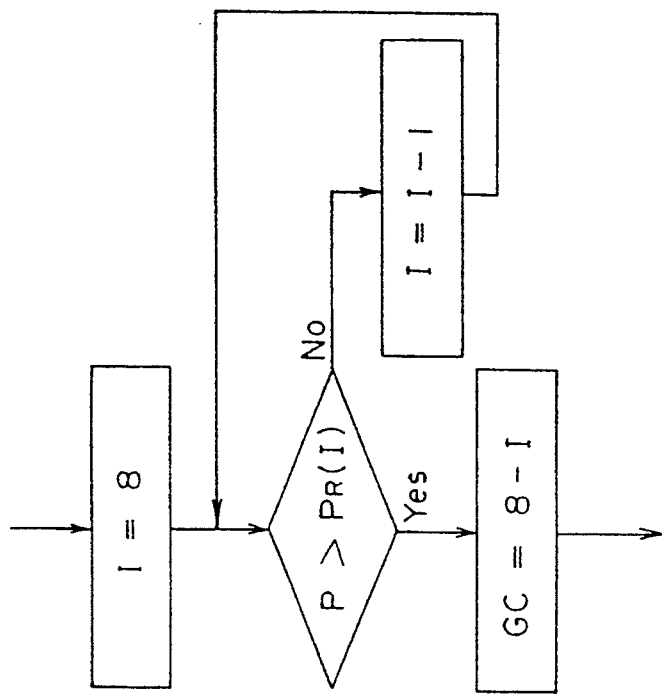
FIG. 17A is a flow chart of a $\sqrt{f}$ AGC and FIG. 17B is a table referred to by the $\sqrt{f}$ AGC shown in FIG. 17A.

FIGS. 17 and 18 show a flow chart for obtaining the code Gc and a table obtained from the above equation, respectively. For example, a power computation P is changed from 16 p/pc to −18 db with regard to a target power PC, and then a separation condition is determined at I = −6. If the condition is YES, Gc = 14 is set. The computed power of a nondistorted waveform is set as a target power. A waveform power distorted by line loss is computed and compared with the target power, and a gain correction is conducted, resulting in an error. However, according to this invention, a most suitable $\sqrt{f}$ equalizer characteristic is constituted by a coarse amplifier with a $\sqrt{f}$ characteristic, and the waveform power is again computed to obtain a state such that the original waveform is reinstated, thereby setting the gain of a fine amplifier and suppressing the error to a minimum.

As described above, in the present invention, as shown in the structure of FIG. 8, namely, that in which an echo canceler is provided after the equalizer, and in which echo canceler training precedes AGC training, switch 30 is switched to the initial gain side $G_I$, and switch 31 for correcting an echo replica ER is switched to the non-correction side, namely, the x1 side. Therefore, line equalizer gain is fixed at GI. The training signal transmitted from the home apparatus performs an arithmetic operation to enable an echo replica to be obtained by an echo canceler 21. Echo canceler 21 has tap coefficients (described later) for producing a adaptive echo replica. Therefore, echo canceler 21 completes a preliminary training. Next, the switch 30 is turned to the side of the AGC circuit 27, causing it to perform an AGC operation to obtain the adaptive gain. The AGC circuit performs an arithmetic operation to obtain the adaptive gain $G_F$ within a constant training period by a training signal received from the opposite apparatus, thereby providing the adaptive gain to a line equalizer, and maintaining it. Then, training of the AGC circuit is completed. Utilizing the adaptive gain $G_F$ and initial gain $G_I$, the gain correction unit calculates the ratio $G_F/G_I$. A multiplying unit within the echo canceler multiplies the echo replica by the ratio obtained from the gain correcting unit so that a correction of tap coefficients is conducted to cancel an echo. Namely, a tap coefficient is stored corresponding to the most appropriate gain. When all the tap coefficients are corrected, switch 31 is switched to its normal position and initial training is completed. Thus, the system is now in a communication state. Next, the case in which tap coefficients are rewritten according to the adaptive gain within the echo canceler is explained.

Figure 18A:
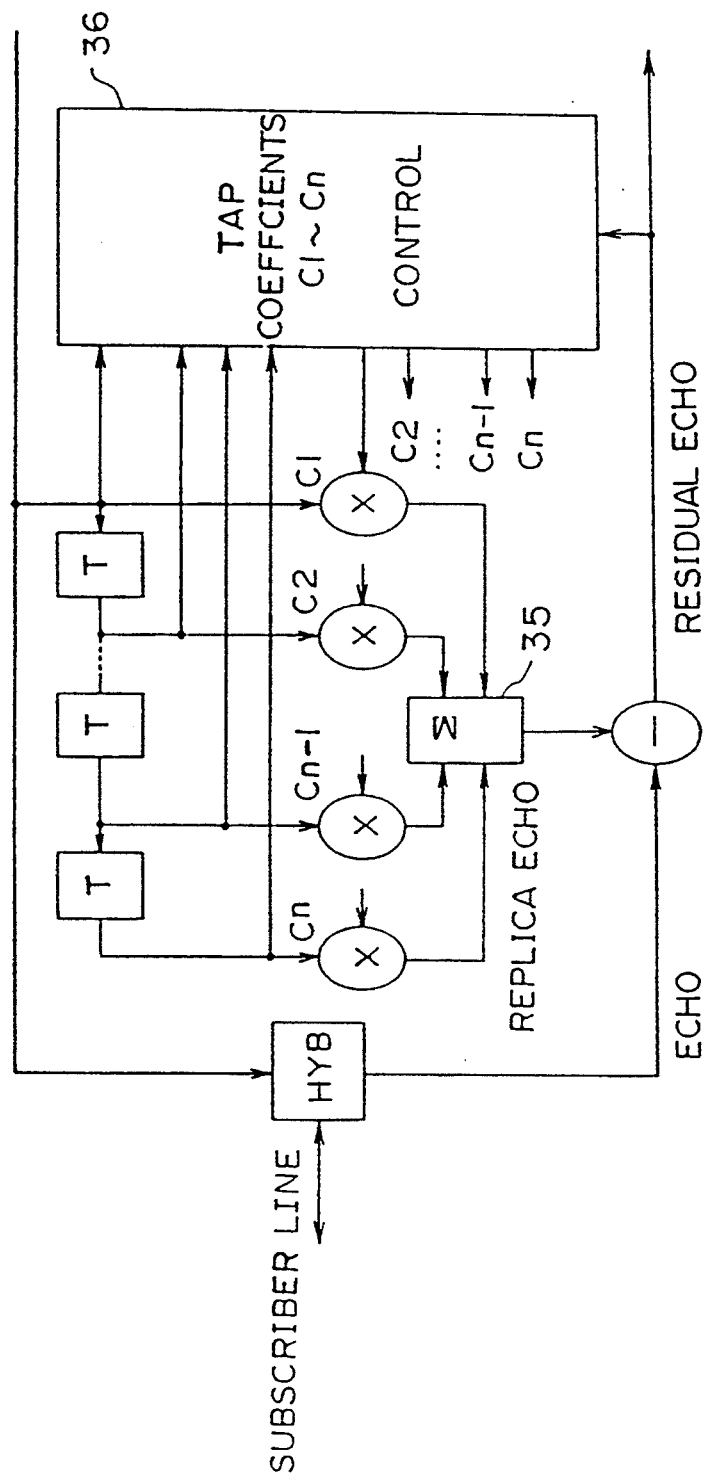
FIG. 18A is a block diagram of a transversal type echo canceler.

FIG. 18A shows a circuit structure of an echo canceler EC i.e. an echo canceler of the transversal type. The blocks T are delay circuits for delaying an input signal, namely, a transmitted signal. The outputs of the delay circuits are entered into one of the multiplier inputs. The other input of the multiplier $C_N$ is supplied by tap coefficient control circuits 36. The output of all the multipliers is given to the adder circuit 35, thereby forming a transversal filter. The outputs of the delay circuit are input to the tap coefficient control circuit. The output of the transversal filter is input to one input of the subtractor as an echo replica signal. The transmitted signal is transmitted to a subscriber line through a hybrid circuit, and is input to the other input of the subtractor as an echo signal in the home apparatus through a hybrid circuit. The result of the subtraction of an echo replica from the signal is output as a remaining signal constituting an error signal.

This error signal is fed back to the tap coefficient control circuit and the adaptive value from Cl to Cn is determined. This value is a tap coefficient. Namely, when an impulse is provided to the transmitted signal through a training process, an echo signal is input to a subtractor. If the tap coefficient is determined at an appropriate value, the output of the transversal filter is not an echo signal of the input. Therefore, the error signal is not 0 and the tap coefficient control circuit changes the tap coefficient in a direction in which the error is decreased. The square or the error signal is considered as an energy function and the tap coefficient is selected such that the energy function is a minimum. The repeating process is concentrated and a echo replica similar to the echo signal of the training pulse is output from the transversal filter. As a result, the error signal of the remaining echo becomes 0. Namely, the transmitted signal is input to the apparatus, and is controlled such that the output of the transversal filter becomes the same as the echo signal. Therefore, the tap coefficient determines a quasi-impulse response.

Figure 18B:
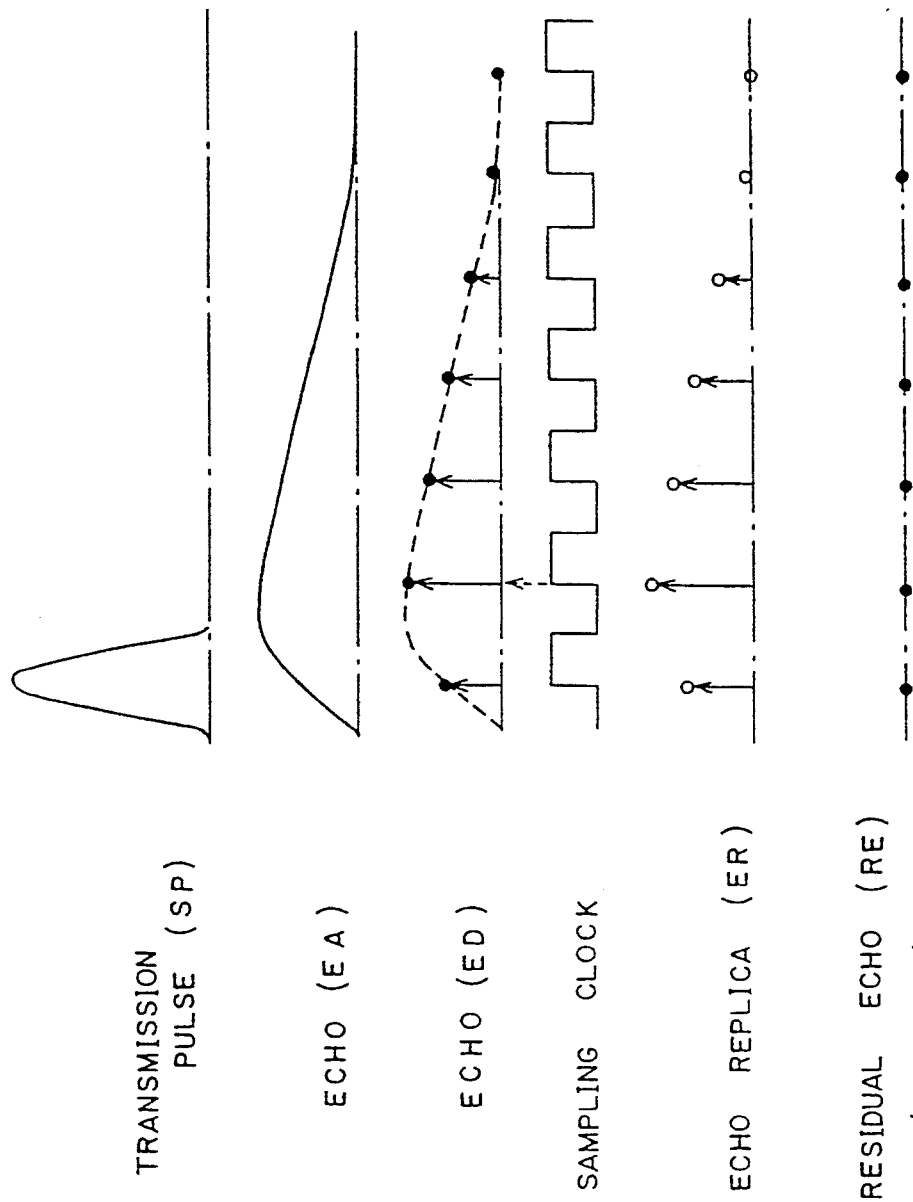
FIGS. 18B is a timing chart for explaining an operation of the echo canceler.

FIG. 18B is a conceptional view for explaining the process of cancelling an echo.

The output of echo canceler 21 is considered as an echo replica to be expressed as a symbol ED and a transmitted pulse is expressed as SP. An echo signal for transmitting a pulse which leaks through a hybrid circuit is EA, and the signal which digitizes the echo signal is ED. The remaining echo, namely, ER—ED, is RE. These waveforms are shown in FIG. 18B. The transmitting pulse, an extremely narrow width pulse, is given as a questionable impulse signal, and then echo signal EA is output as a gently-sloping waveform signal from the hybrid circuit. The output is subjected to A/D conversion. The A/D converter is sampled by a sampling clock and quantized at a rising point of the sampling clock. The quantized output becomes ED, and is output. On the other hand, transmitted pulse SP controls the echo canceler so that its output is equal to echo signal ED, and the result is output as echo replica ER. When the echo canceler selects an appropriate coefficient, almost the same waveform as echo ED is output as ER, as shown in FIG. 18B. However, as echo replica ER is not equal to a complete echo signal ED, the output of the subtractor, namely the remaining echo, is expressed as RE, equal to ED-ER. If the signal of echo replica ER equals echo signal ED, the residual echo RE, as shown in FIG. 18B, is almost 0.

Figure 19:
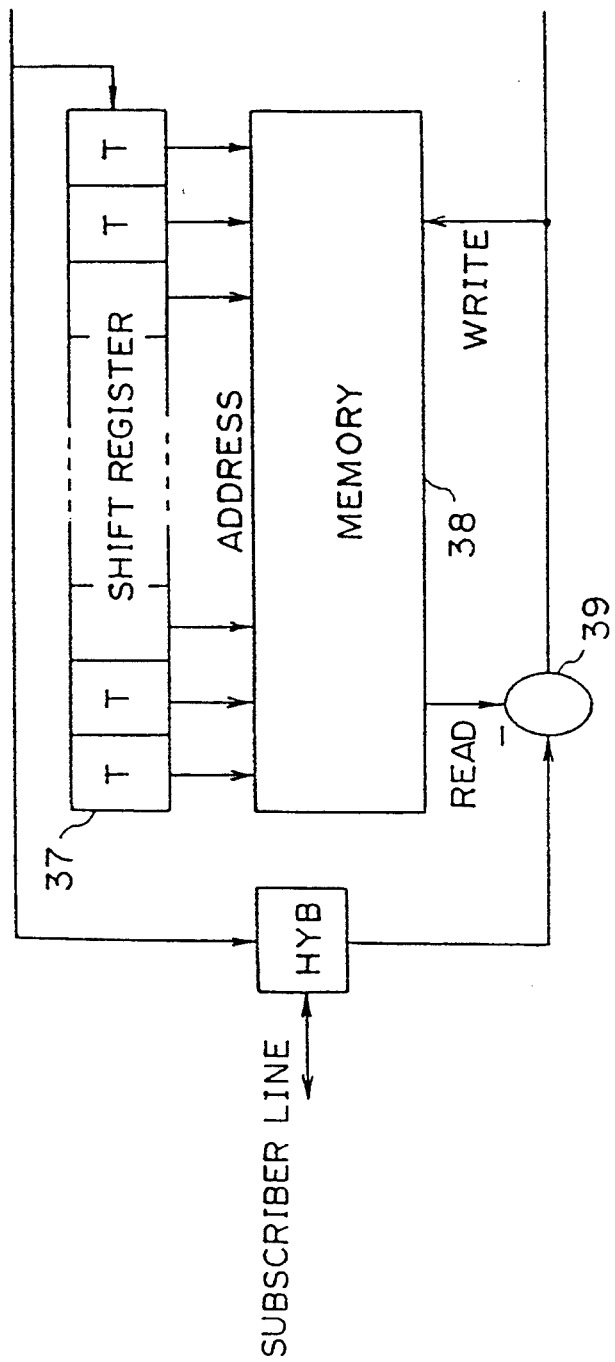
FIG. 19 is a block diagram of a table reference type echo canceler.

FIG. 19 is a structural view of a table reference type digital echo canceler. 37 shows a shift register and 38 shows a RAM. A transmission pattern corresponding to the transmitted signal is supplied to the shift register 37 as 01 pattern in a bit serial manner, and the transmitted pattern is applied as the address of a memory. An echo replica signal is read out from the memory and entered into one of the inputs of subtractor 39. The other input of the subtractor 39 receives an echo signal formed by a transmission pattern through a hybrid circuit. The output of the subtractor is the remaining echo. An echo replica signal corresponding to the transmission pattern is stored in a memory, and the interrelationship between the transmission pulse and the echo replica signal corresponding to the transmission pulse is stored in the memory to perform an echo cancelling operation. In order to produce the most suitable echo replica signal, the memory content is dynamically rewritten through a data line a.

Figure 20:
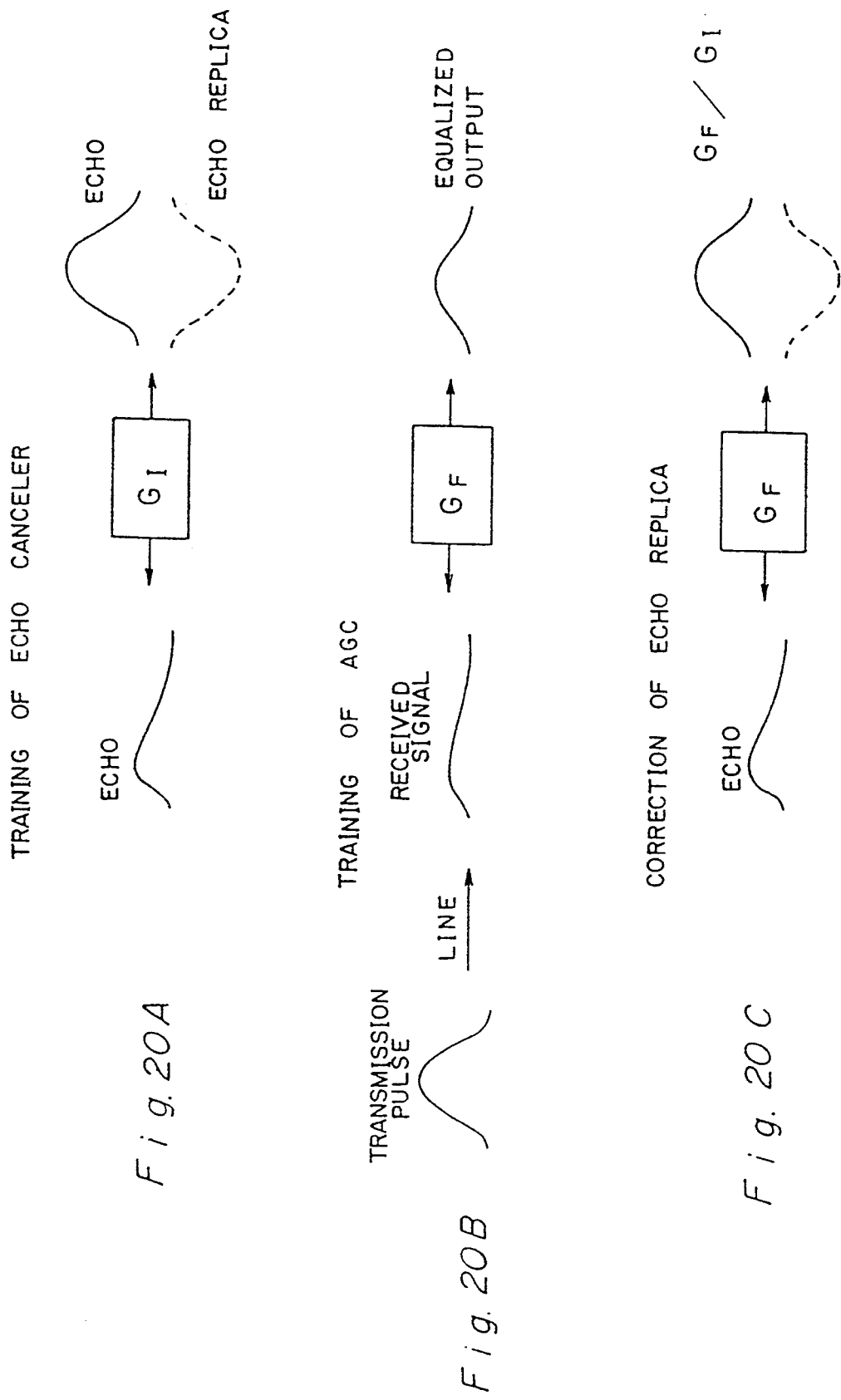
FIGS. 20A to 20C are schematic drawings for explaining a correction of an error of an echo replica together with waveforms of a received signal and transmitting signal.
Figure 21:
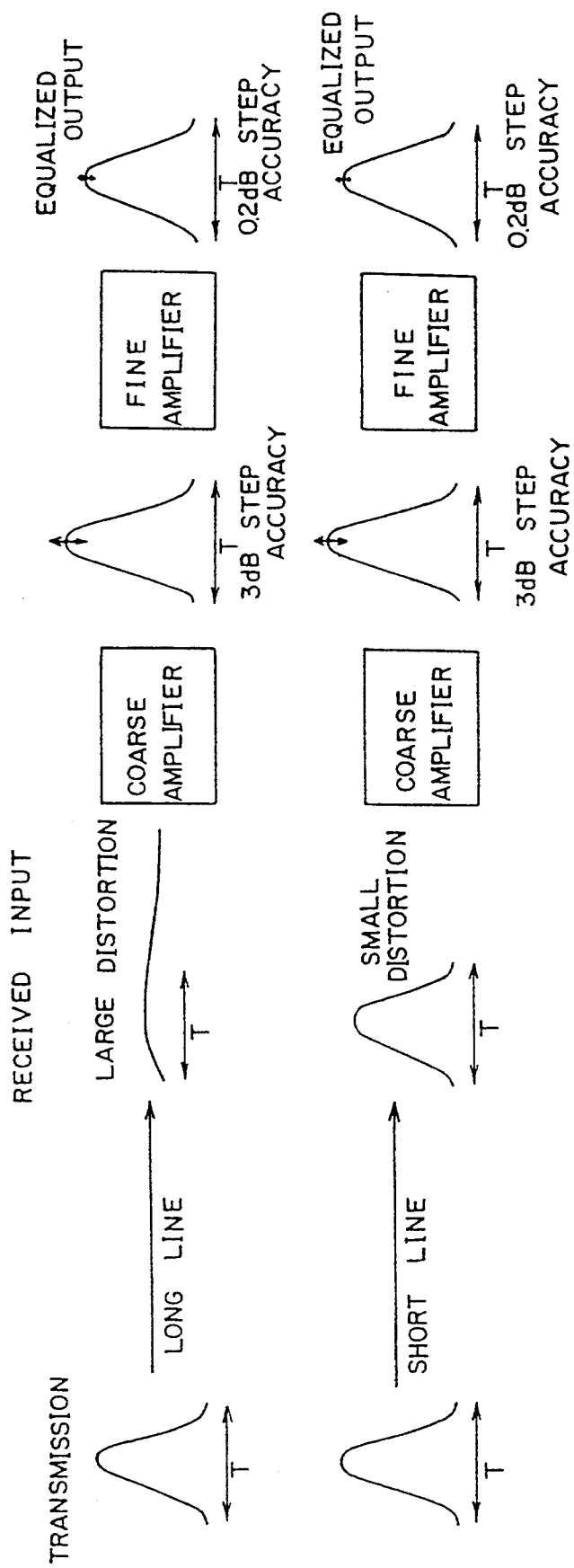
FIG. 21 is a diagram explaining a waveforming conducted by a $\sqrt{f}$ AGC equalizer.

FIGS. 20A, 20B and 20C show a method of correcting the echo replica by using a waveform forming and the adaptive gain. FIG. 21 is a conceptional diagram showing how a waveform is formed by $\sqrt{f}$ AGC. FIG. 21 is a conceptional view showing how an echo replica is formed by using a transmitted and received waveform and $G_I/G_F$.

FIG. 20A shows a training of an echo canceler and when the transmission pulse is transmitted from the apparatus to the transmission line, echo is transmitted from the hybrid circuit to the home apparatus, namely, on the receiving path. According to this invention, even if an echo canceler is provided after the automatic gain equalizer in order to decrease the bit number upon the conversion of the input, echo training of echo cancellation is conducted before the training of the automatic equalizer. The gain of the equalizer concerning the received signal is fixed at $G_I$ and the echo signal is thus amplified by this initial gain. On the other hand, the echo canceler is subjected to a training such that the echo canceler can produce an echo replica signal by multiplying the echo signal by $G_I$. An echo replica signal obtained by an echo canceler is a pseudo signal of the actual echo and the gain $G_I$ is not the adaptive $G_I$. Thus, the echo replica does not have the same waveform as the echo, as the difference between them, i.e. the remaining echo is not 0. As shown in FIGS. 20B and 20C the difference between an echo and an echo replica is not expressed by a subtraction but by a sum. When the training signal of the transmitting pulse is received from an opposite apparatus, the received signal is attenuated in accordance with a $*f$ characteristic of loss. During the training of AGC, the power of the received signal is calculated and the adaptive gain $G_F$ is selected to reproduce the original transmission pulse based on the power calculation. Namely, because of the training of the AGC, a distorted received signal is amplified, thereby providing the reproduction of the original transmission pulse in respect of its waveform.

As shown in FIG. 21, a waveform formed by $\sqrt{f}$ AGC equalizer provides a pulse width larger than the pulse width T of the transmission pulse if the length of the transmission line is much longer than the pulse width T, thereby producing a waveform signal of a large waveform distortion. This is reproduced by a coarse amplifier to provide an original transmission pulse of 3 db-step accuracy. As it is a coarse control, a rough pulse is reproduced. Therefore, by using a fine amplifier, the pulse is further corrected to 0.2 db step accuracy, thereby reproducing the same pulse as the transmission pulse. If the transmission pulse length is very short, the pulse width T of the received signal is similar to the pulse width T of the transmitted pulse, thereby producing a less distorted received signal. In FIG. 21B, the received signal is obtained by multiplying the transmitted pulse by $G_F$ and thereby reproducing the original pulse. In this instance, the adaptive $G_F$ is determined by the AGC. When the echo is multiplied by $G_I$, an echo replica signal of the same value as the original transmission signal is obtained. For $G_F$, the echo replica signal is multiplied by $G_F/G_I$ where the received signal is obtained by multiplying the echo by $G_F$. The difference between the actual echo and the corrected echo replica signal is almost 0. As stated above, even if the echo canceler is provided after the equalizer, the echo canceler can train the echo.

Figure 22:
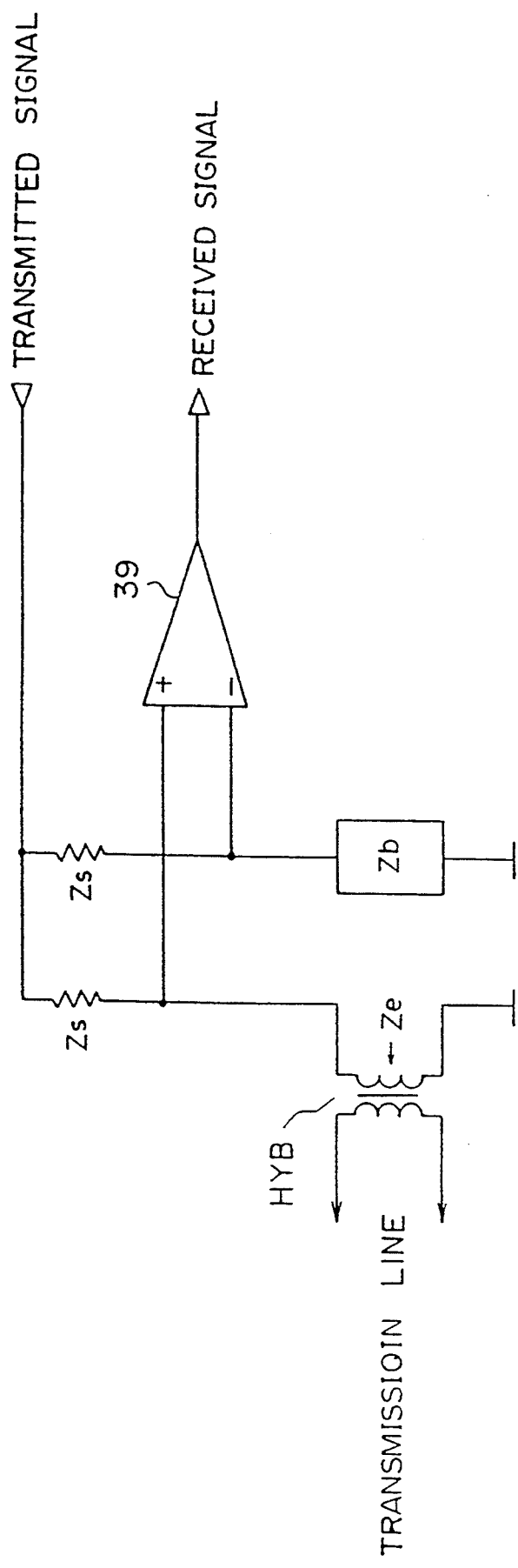
FIG. 22 is a circuit diagram of a hybrid circuit.

FIG. 22 is a circuit diagram of an embodiment of a hybrid circuit. The voltage of the transmitted signal is divided by $Z_s$ and $Z_e$ and is transmitted to a transmission path through a hybrid transformer HYB. In this case, the reference voltage within an apparatus is grounded and the reference voltage of the transmission pulse is one terminal of the secondary side of the transformer. The difference voltage on the primary side of the transformer is transmitted to the transmission path, as the voltage is floating from the earth. The voltage of the transmitted signal divided by $Z_s$ and $Z_b$ is supplied to a minus terminal of a differential amplifier 39. Therefore, when a signal is transmitted and $Z_b$ is determined to be equal to the impedance $Z_e$ which is obtained by viewing the transmission path, the received signal becomes 0. But $Z_b$ cannot generally be made equal to $Z_e$. Therefore, the echo signal leaks into the receiving side. The received signal is converted to a voltage through the transformer input to the plus side of the differential amplified. In this case, the minus terminal of the differential amplifier 39 is 0 volts. The voltage corresponding to the input voltage of the transmitted pulse appears as the output of the differential amplifier.

Figure 23:
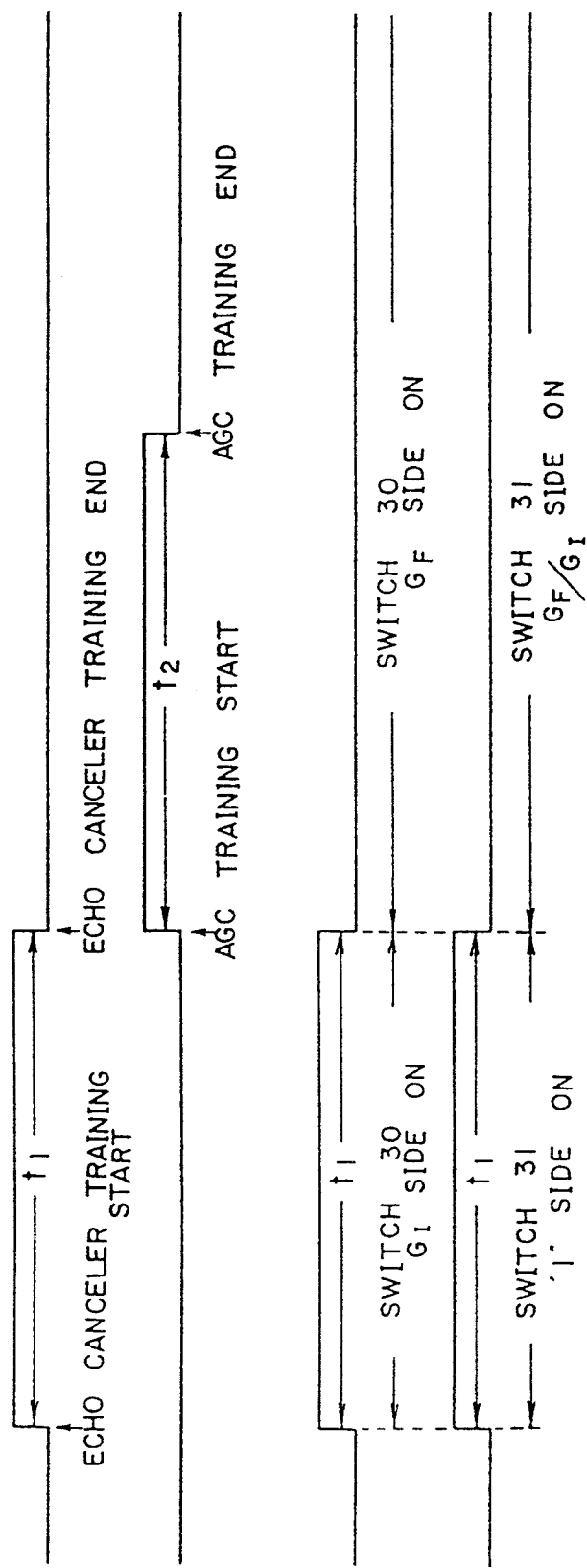
FIG. 23 shows a timing chart for explaining an initial training of the transmission apparatus for a switching timing of switches in FIG. 8.

FIG. 23 shows a timing chart of an initial training of the transmission apparatus according to this invention.

Even if the echo canceler is provided after the equalizer, an echo training can be conducted before the training of the equalizer. The on periods of switches 30 and 31 in FIG. 8 are respectively $t_1$ and $t_2$, and are determined by a timer. It takes time for the echo canceler to form an echo replica signal to cancel echo produced by the transmitted pulse and this is called the training time of the echo canceler. As shown in FIG. 23, training of the echo canceler is completed $t_1$ after it starts. When it is completed, AGC training is started. Therefore, a total time of $(t_1+t_2)$ passes before the transmitted pulse is received from another apparatus and the power of the received signal is calculated to obtain the adaptive gain from the calculated value. Training of the AGC is completed time $t_2$ after it starts. According to the present invention the switch is controlled to perform a training of the echo canceler and the AGC twice. When switch 30 in FIG. 8 is turned to the $G_I$ side, and the switch 31 is turned to the fixed value 1 side, the training of the echo canceler is conducted with respect to the gain $G_I$. The multiplicataion factor of the replica of the echo canceler is set to 1 by switch 31. From start to end of AGC training, the switch 30 is turned to the $G_F$ side, and switch 31 is controlled to select $G_F/G_I$. Namely, the gain $G_F$ of the equalizer is selected by the automatic gain controller and $G_F/G_I$ is calculated by the gain correcting unit, and the switch 31 is turned on such that the output achieves an amplification factor of an echo replica.

Figure 1:
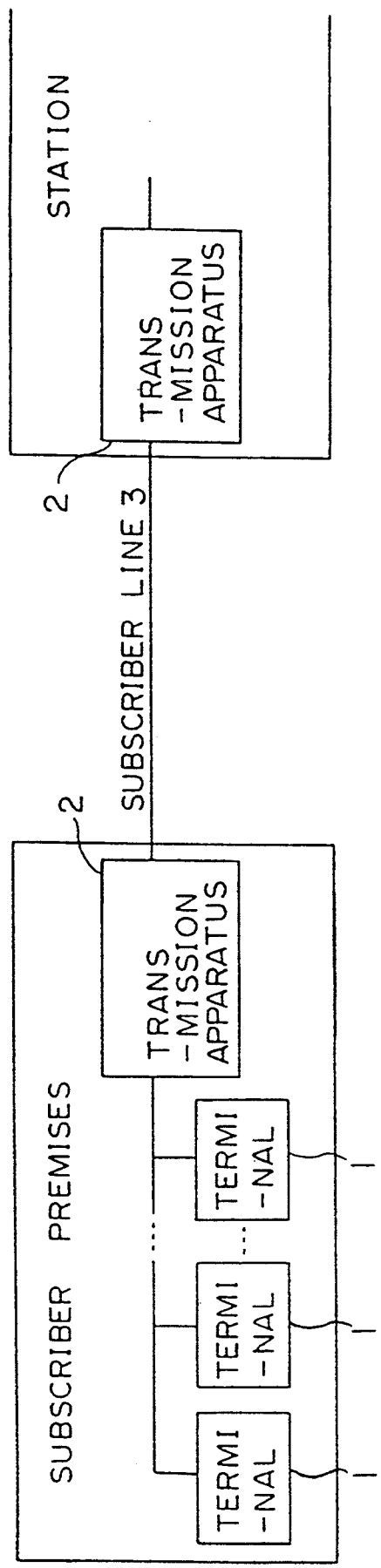
FIG. 1 is a block diagram showing the digital subscriber line transmission.
Figure 2A:
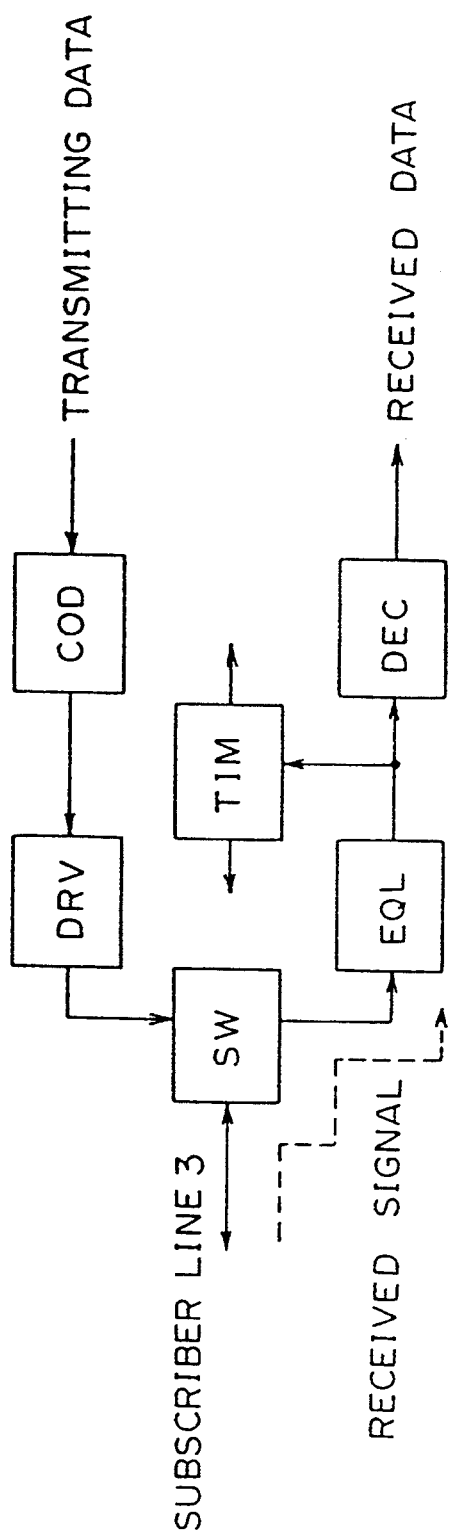
FIGS. 2A to 2B illustrates different transmission systems.
Figure 2B:
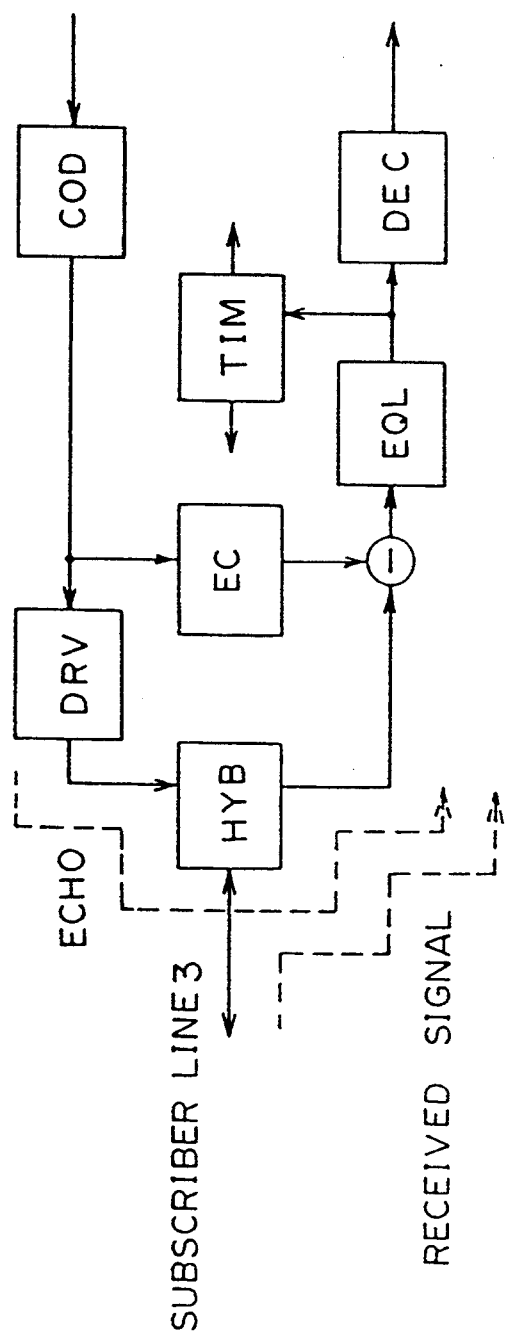
Figure 3A:
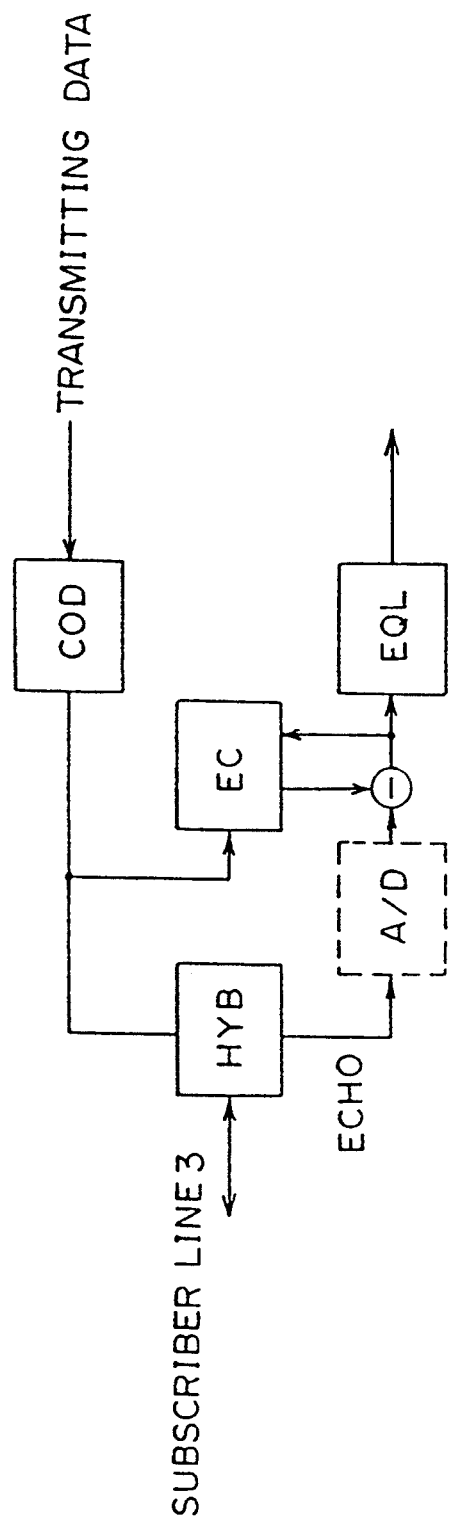
FIGS. 3A to 3C show prior art transmission apparatuses using echo cancelers.
Figure 3B:
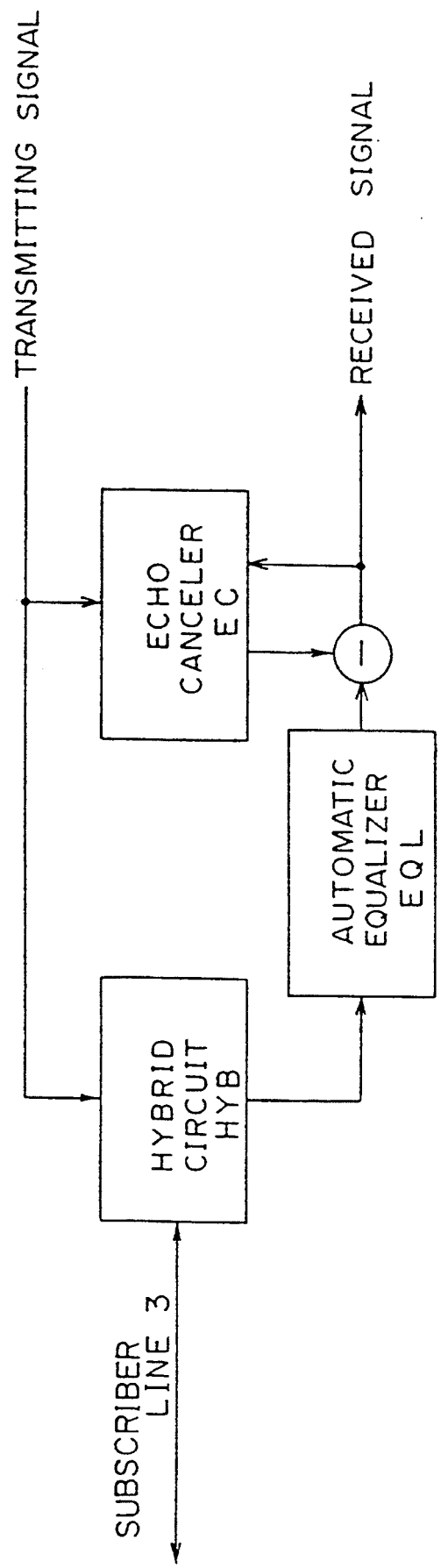
Figure 3C:
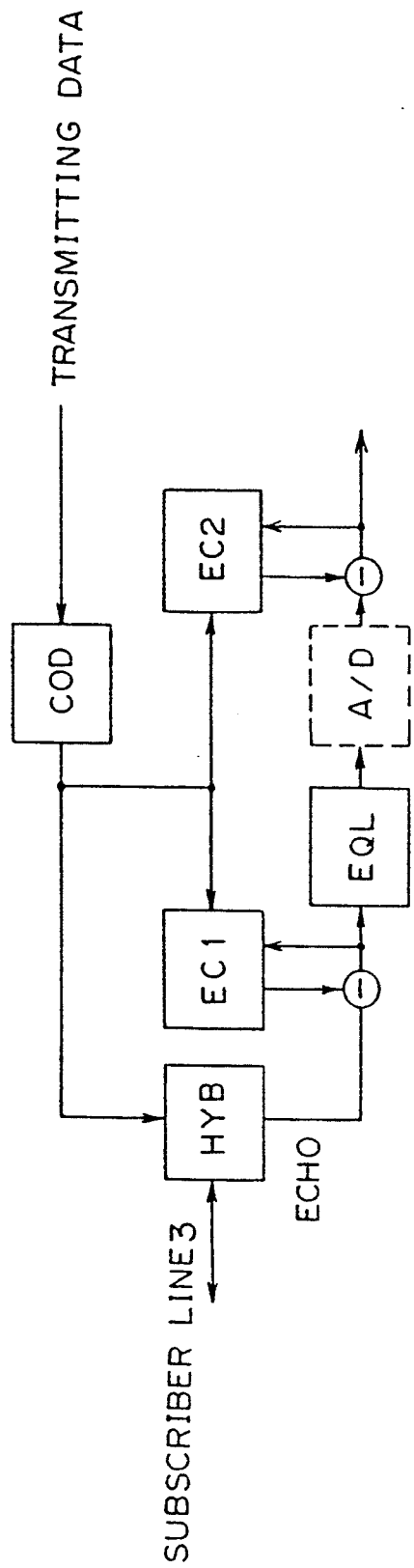
Figure 4:
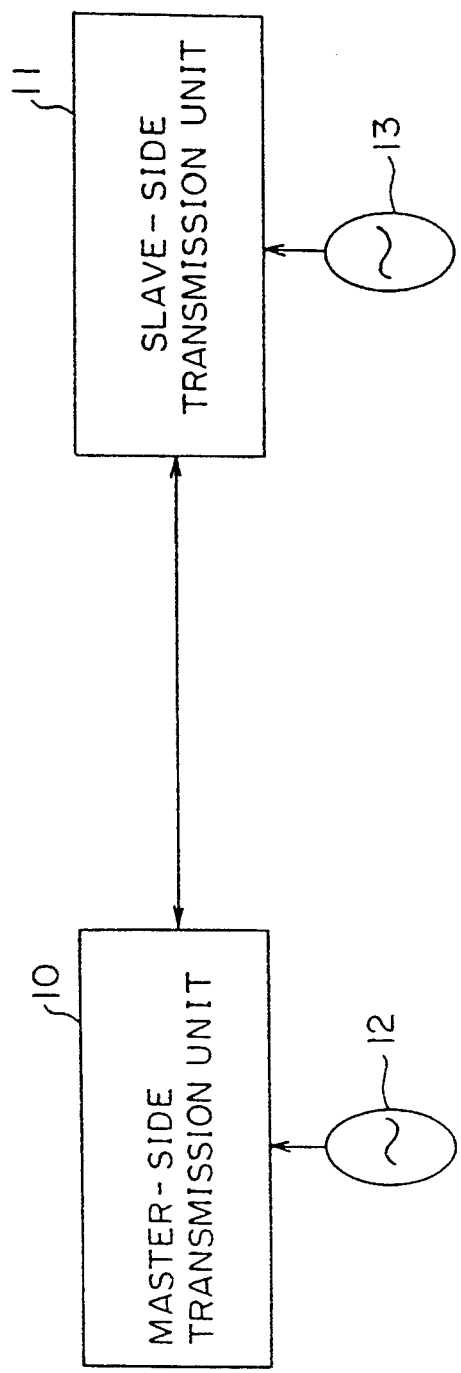
FIG. 4 shows a schematic diagram of a transmitting system.
Figure 5:
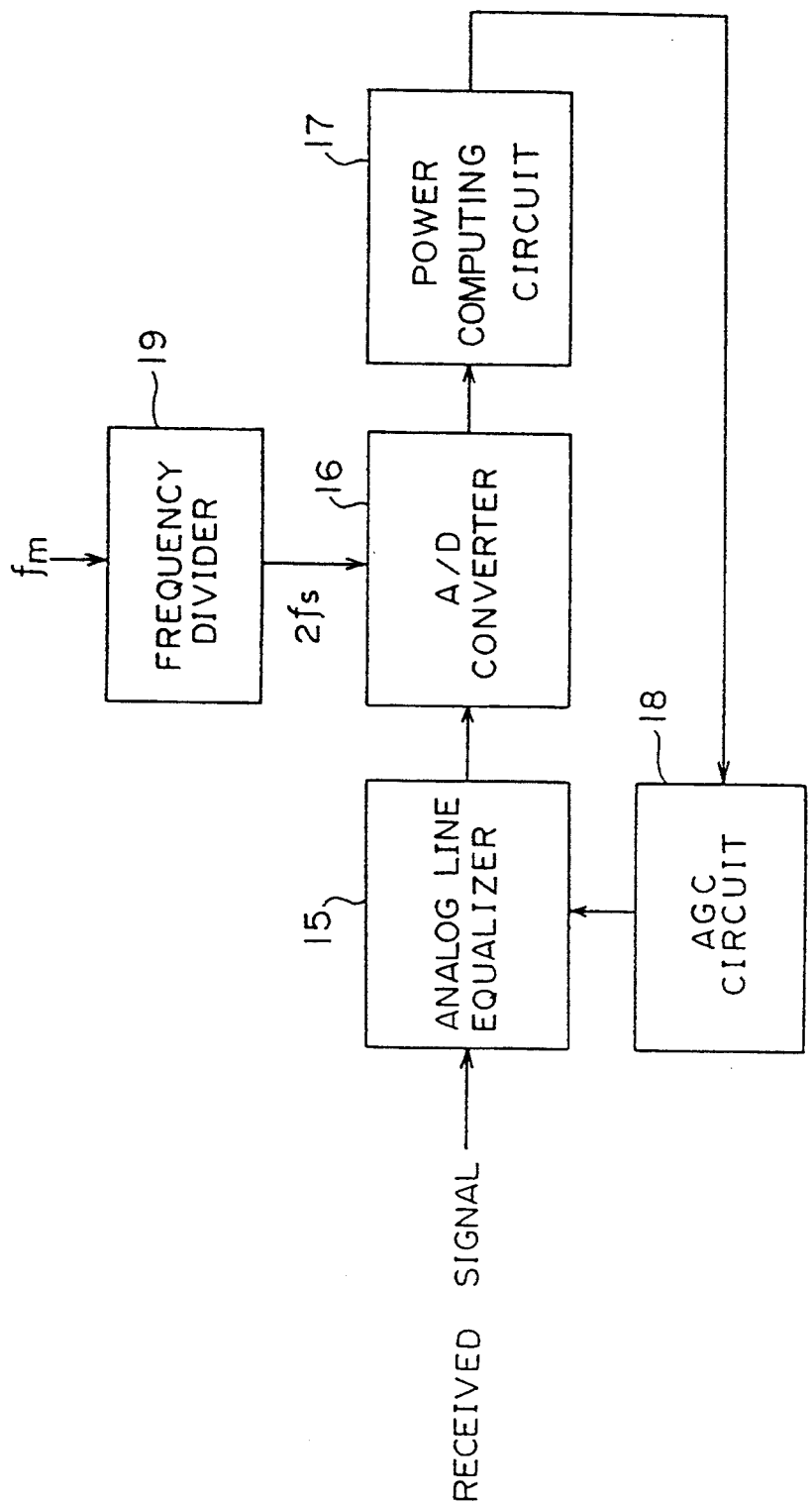
FIG. 5 is a block diagram of a conventional transmission apparatus.
Figure 6:
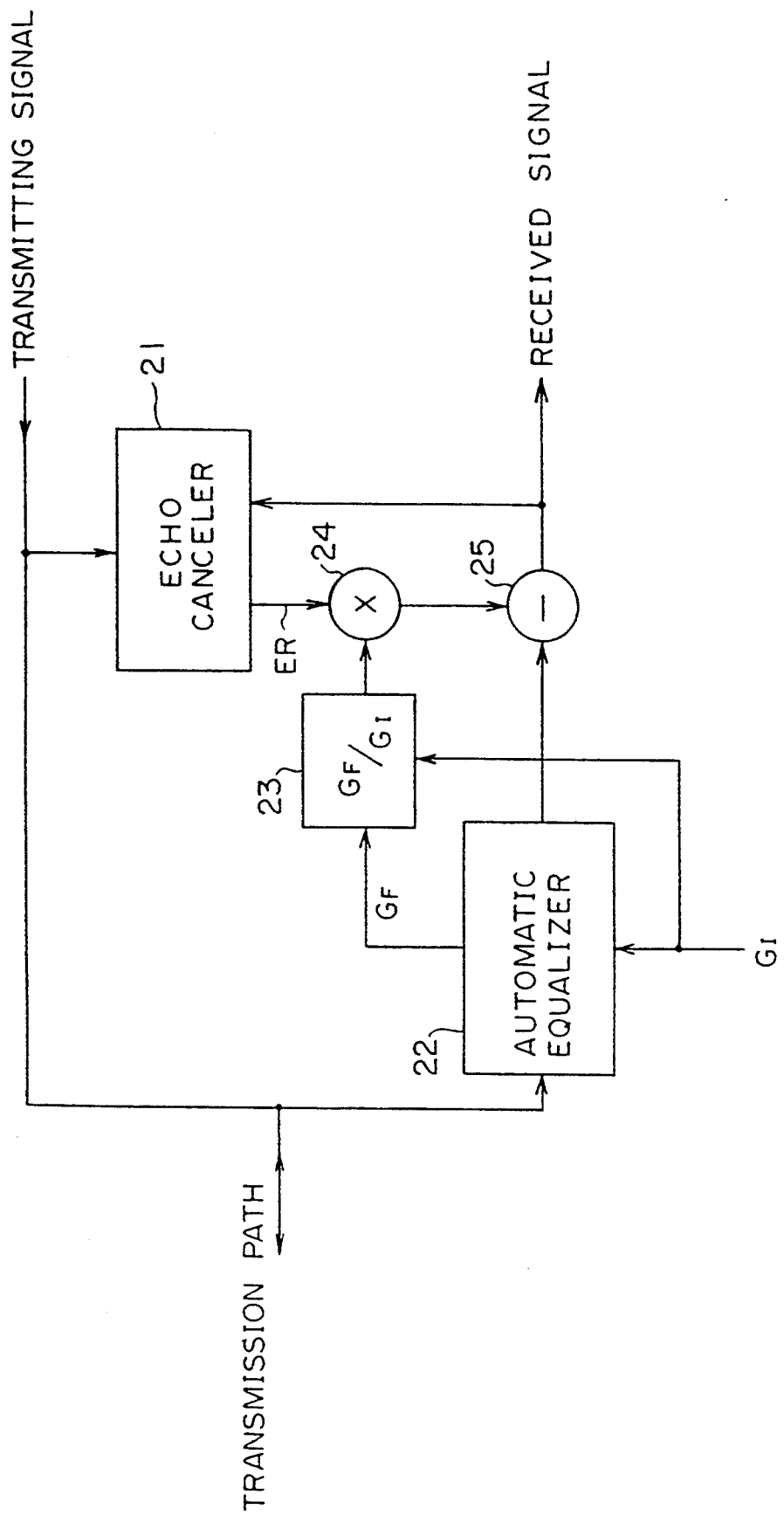
FIG. 6 is a block diagram showing the principle of the present invention.
Figure 7:
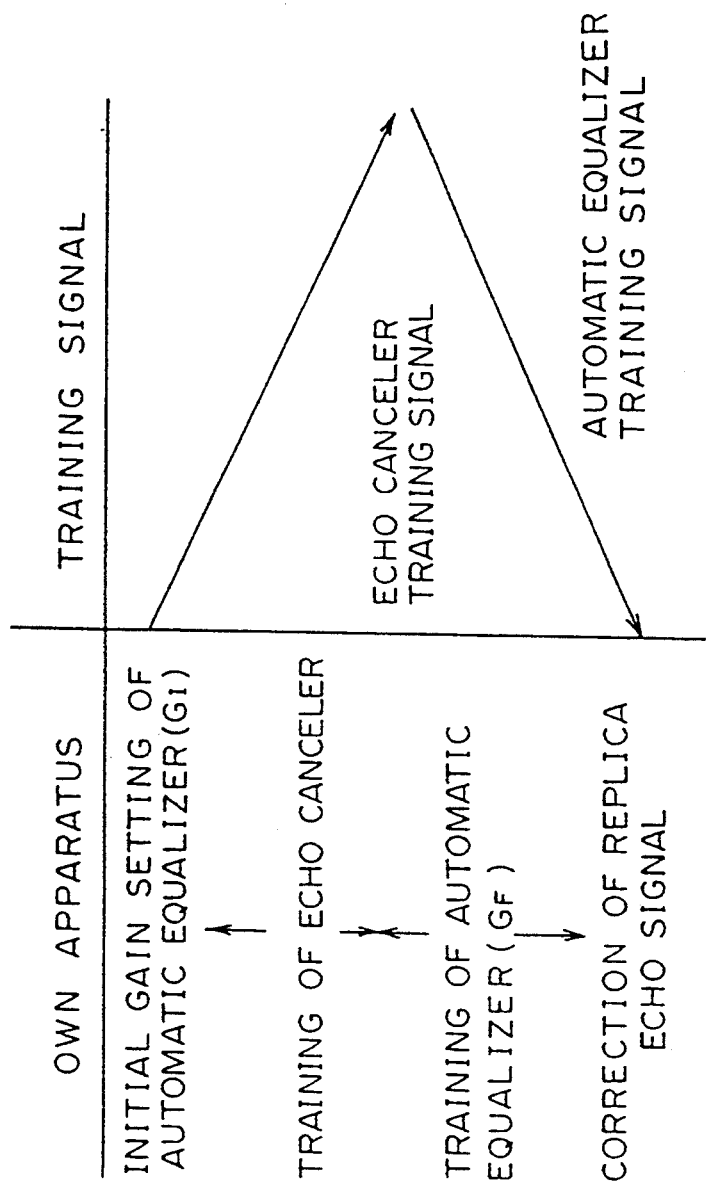
FIG. 7 shows the operational sequence of the present invention.
Figure 24:
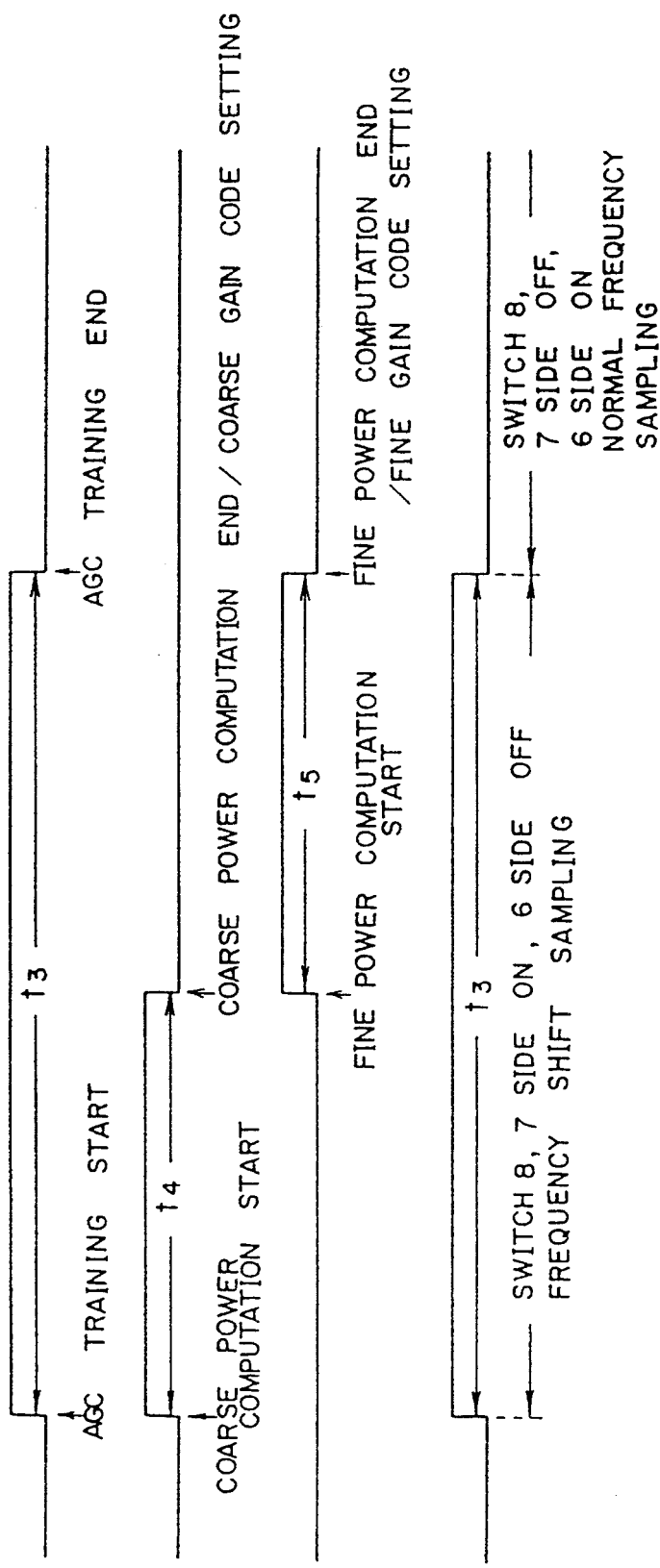
FIG. 24 shows a timing chart for explaining an initial training of the transmission operation for a switch in FIG. 8.

FIG. 24 is a timing chart showing the initial training method of the $\sqrt{f}$ equalizer shown in FIG. 3. $t_3$ is the time from start to end of AGC training. A coarse power computation taking time $t_4$ is first conducted. When this is completed the output of the coarse gain setting decoder is determined and a coarse gain code is set. Then a fine power computation taking time $t_5$ is conducted. The fine power computation ends after a total time $t_3$ and the fine gain setting decoder of FIG. 15 sets the fine gain code. That is, time $t_3 = t_4 + t_5$, corresponds to the time from start to end of AGC training and this training time is determined by the frequency shift sampling. After AGC training is completed, the device reverts to normal switching status. Thus, a normal frequency sampling is performed.

Figure 25:
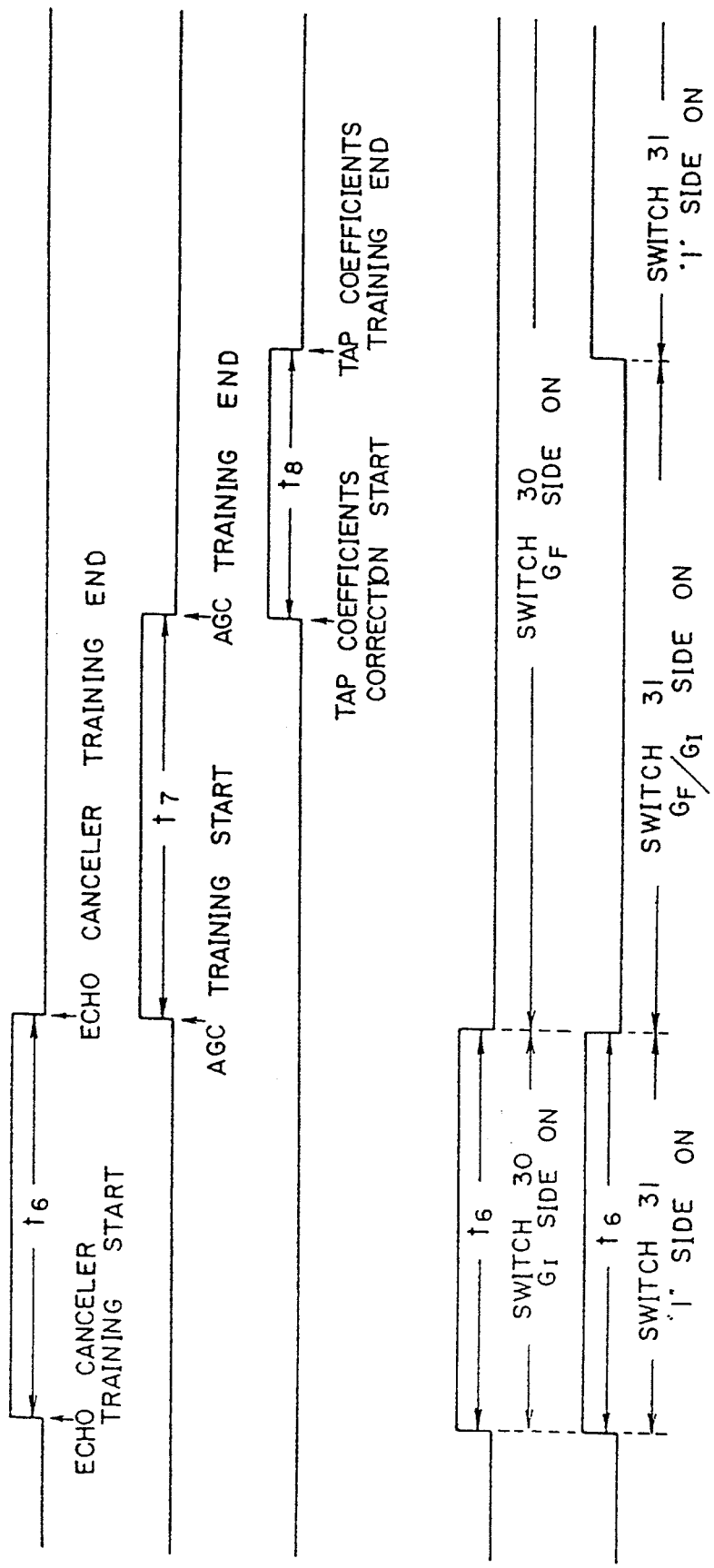
FIG. 25 shows a timing chart for explaining an initial training of the transmission apparatus for a switch in FIG. 8, FIGS. 26A and 26B are timing charts of sampling operation of the prior art and the present invention respectively.

FIG. 25 shows a second example of a timing chart for switching of switches 30 and 31 during training of the AGC and echo canceler. $t_6$ is the time from start to end of echo canceler training. In this case, switch 30 is turned to the $G_I$ side and switch 31 is turned to a fixed value "1" side. Equalizer gain is fixed at the value $G_I$ and the gain of the echo replica is 1. When echo canceler training is completed, AGC training starts, and switch 30 is turned on to the $G_F$ side and switch 31 is turned to the side from which $G_F/G_I$ is output. AGC training is completed after time $t_7$ and then the adaptive $G_F$ is obtained. This $G_F$ is used to calculate $G_F/G_I$. To correct the remaining echo, echo canceler training starts again within the echo canceler after AGC training is completed, thereby initiating a correction of tile tap coefficients. The correction of tap coefficients and initial training is completed after time $t_8$. At this point, switch 31 is turned to the gain "1" side to enter the device into a communication status. According to the present invention, if the echo canceler is located after the equalizer, the initial training of the transmission apparatus can be conducted without relying on the training order. Even under the rule that echo canceler training be conducted prior to AGC training, the adaptive training is conducted. Even if echo canceler training is conducted after automatic quantizer training initial training of the transmission apparatus is realized.

In the above embodiment shown in FIG. 8, A/D converter 28 is placed after line equalizer 22 but it may be placed before line equalizer 22, thereby enabling line equalizer 21 to perform a digital processing.

Further, even where a correction of a replica signal is not sufficient, the echo canceler can suppress the echoes to maintain adaptive operation during a communication.

If the training of the transmission apparatus is conducted in the order of automatic equalizer and then echo canceler as is similar to the prior part, switches 30 and 31 may be set at the position shown in FIG. 8.

As described above, according to the initial training method of the present transmission apparatus, an automatic equalizer is, at first, fixed to an initial gain to perform a training of an echo canceler, and thereafter the adaptive gain which is most appropriate for an automatic equalizer is obtained. Then the ratio of the adaptive gain to the initial gain is obtained to correct a replica signal during a communication. Therefore, even if the echo canceler is provided after the automatic equalizer, an initial training can be realized independently of the order of training. The design of the apparatus is thereby made more flexible and the cost is reduced.

As generally described, the transmission apparatus has an automatic equalizer to compensate for deterioration of signals passing through the transmission path, and the automatic equalizer adopts a method of A/D converting a received signal to perform an arithmetic operation thereon. In order to establish mutual synchronization between transmitted and received signals before the start of a normal data transmission, an AGC and an echo canceler training can be conducted as an initial training. In the initial training of an automatic equalizer equipped with an A/D converter, there is a problem of how to determine the sampling rate for sampling the converter.

The sampling frequency of the A/D converter corresponds to the transmission rate. The initial training is determined to be a value shifted a predetermined amount from the sampling frequency. The appropriate frequency is determined after the training is completed. This new method will be explained later.

Figure 26A:
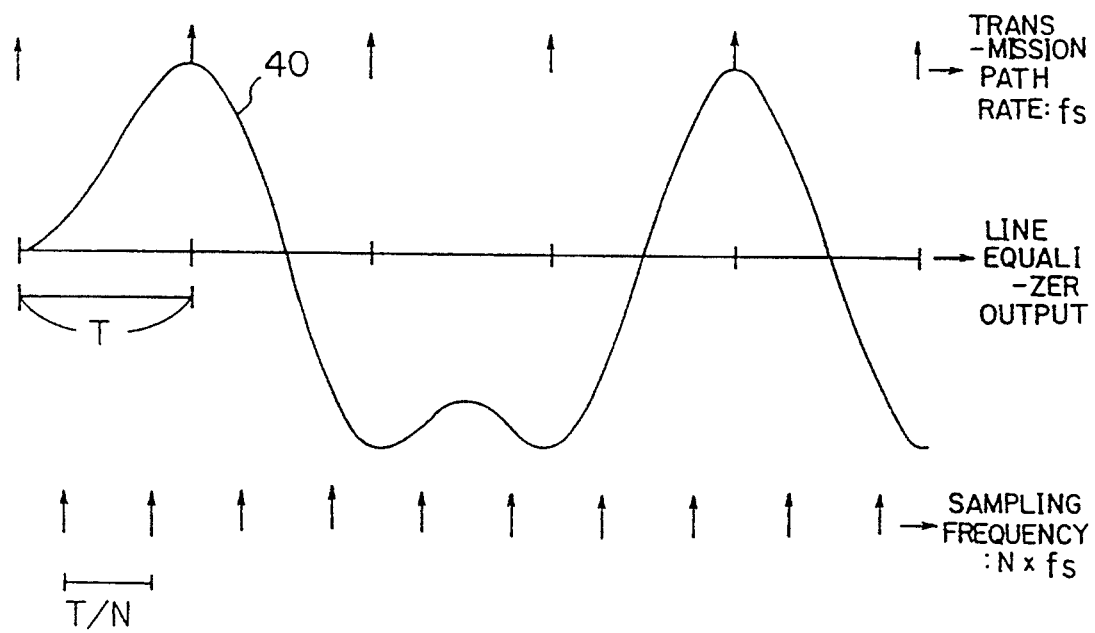
Figure 26B:
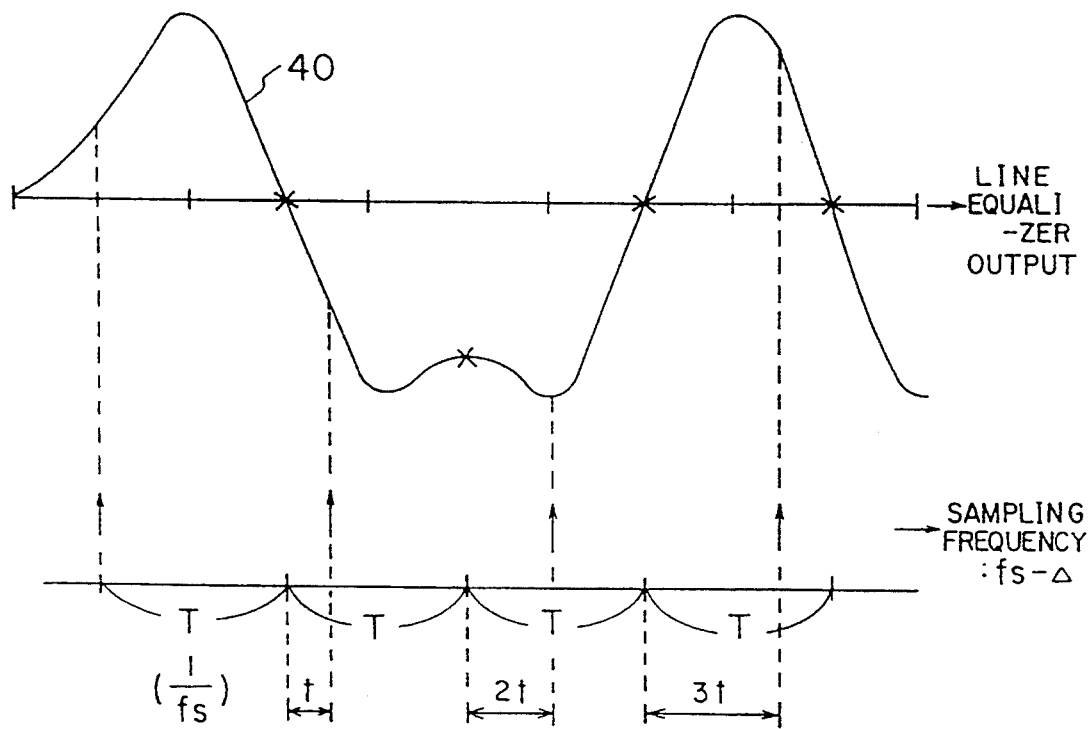

FIGS. 26A and 26B respectively show an operation of the sampling method of the prior art and the sampling method of the present invention. Generally speaking, training of the automatic equalizer is conducted during an initial training period of the transmission apparatus. After the correct received signal is reproduced, timing information of clock signals can be achieved by PLL. Therefore, upon initial training, a timing, namely, phase information of the received signal, is not obtained. Therefore, in order to perform an AGC training during a period of no timing information, as shown in FIG. 26A, the received signal must be subjected to an A/D conversion at a sampling frequency N×fs: more than twice that of the received signal rate or transmission path rate fs. Namely, 40 is a received signal and T is a period, and the inverse of T is transmission path rate, namely, frequency fs. The sampling frequency for A/D conversion is shown as being sampled at a position designated by the arrows in the lower side of FIG. 26A. The period is T/N. Therefore, when an automatic equalizer equipped with an A/D converter having such a high speed sampling frequency is integrated, it is difficult to achieve economy, miniaturization and high reliability in the transmission apparatus. Further, as has recently been observed, transmission path speed increases with the expansion of transmission capacity. This causes a great problem. Therefore an object of the present embodiment is to provide an automatic gain controller equipped with an A/D converter whose sampling rate is low. In order to provide a method of performing a sampling upon an initial training of the automatic gain controller, a frequency shifted a predetermined amount from the transmission path rate $f_s$ is used as a sampling frequency and thereafter the sampling rate is set to the transmission path speed, that is, a baud rate.

Figure 27:
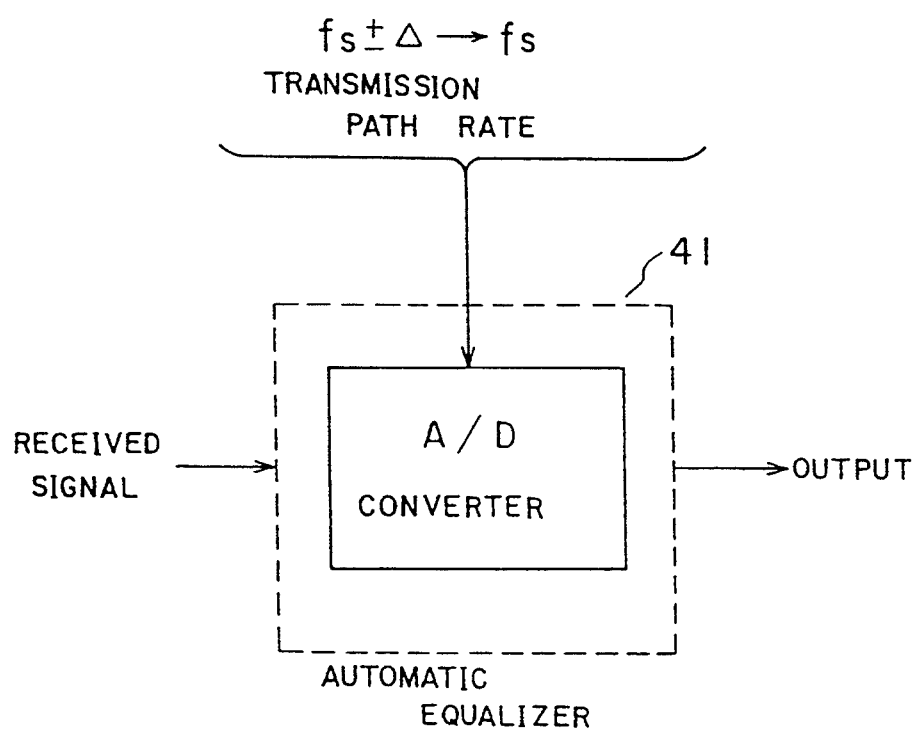
FIG. 27 shows the principle of the embodiment shown in FIG. 26B, FIGS. 28 to 30 show embodiments for determining an appropriate sampling rate.

FIG. 27 is a conceptional view of an A/D converter 41 of this embodiment and FIG. 26B an operation diagram of a sampling of this invention.

In an initial training of a sampling frequency, an initial training method of the automatic equalizer shown in FIG. 27, the sampling frequency for the initial training is determined as fs+Δ with regard to baud rate $f_s$, and when the training is completed the sampling frequency is returned to fs. The sampling phase of the A/D converter 41 within a transmission apparatus before the timing information of the received signal is obtained, performs a freerunning between the master and slave source oscillators at a rate determined by the frequency error (normally 0 to several hundreds of ppm) with regard to the received signal phase.

As shown in FIG. 26B, the present invention intentionally sets the sampling frequency to a value shifted a predetermined amount ±Δ from the transmission path rate fs, thereby providing a sampling frequency of fs±Δ. The analog waveform in the FIG. 26B is the output of a line equalizer. If the sampling frequency is set to fs−Δ, the sampling position is determined to be a period T+t with regard to the period T of the transmission path. In this case a more stable power can be obtained than that with a sampling frequency fs, namely, with a period T. If this shifted sampling is conducted by shifting the period T by t, namely, the sampling frequency is determined as fs−Δ, the initial sampling point is the same as the baud rate sampling point designated by a mark on the analog waveform of the output waveform from the line equalizer. However, the following sampling point occurs after time T+t, the following one after time 2(T+t) and the next after time 3(T+t). Therefore, the first point is shifted by t from the period T of the sampling frequency, the second by 2t, and the third by 3t. This means that the waveform of the output signal from the equalizer is scanned when the waveform is observed for a long period. Therefore, the power computation can be conducted almost correctly. Namely, the correct power computation result is obtained and the training is conducted. After the training is completed, the sampling frequency is switched to the transmission path rate $f_s$ and the sampling frequency of the A/D converter is decreased until it reaches near the transmission rate.

Figure 28:
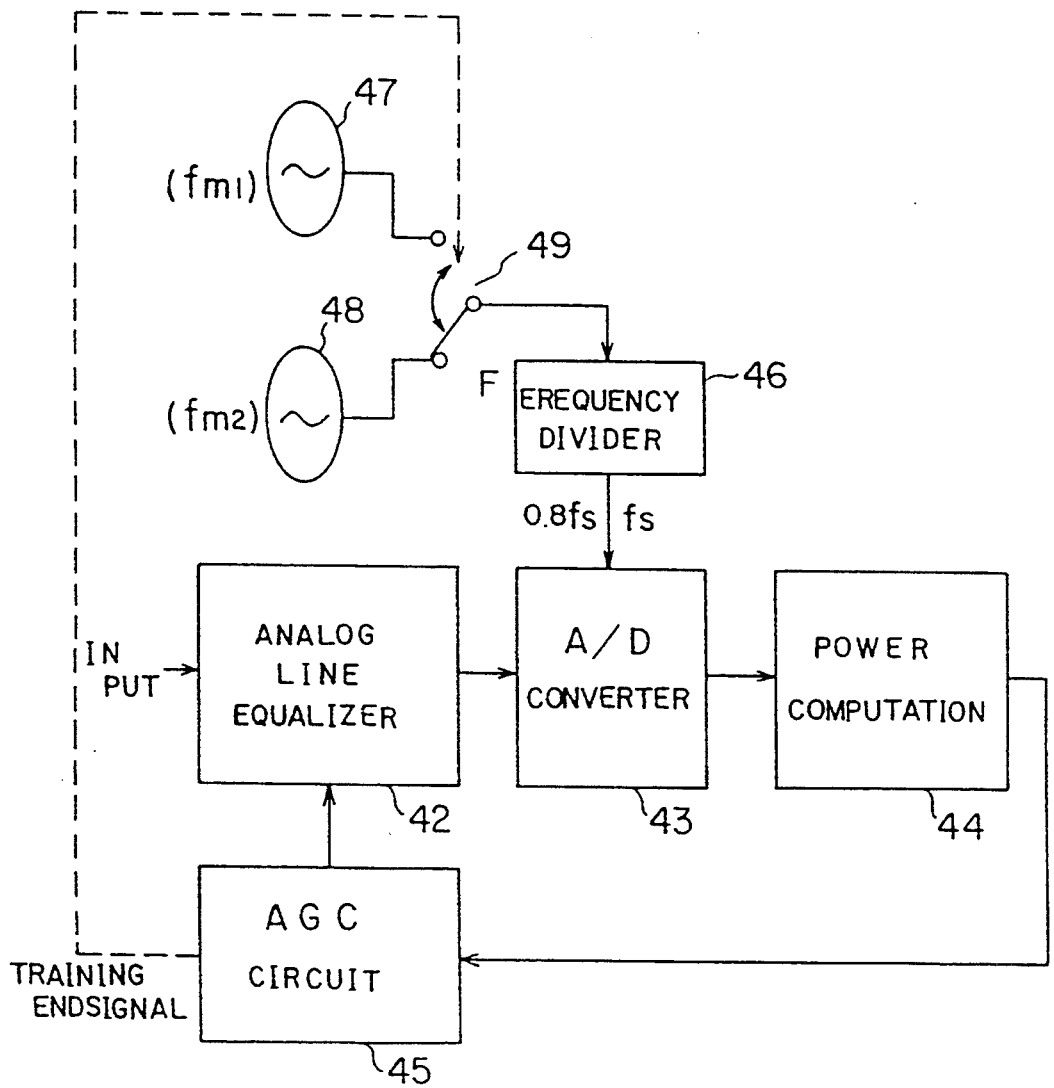

According to the initial training system of the automatic equalizer shown in FIG. 28, the embodiment comprises analog line equalizer 42, A/D converter 43, power calculation circuit 44, AGC circuit 45, and frequency divider 46, as is similar to FIG. 8. Source oscillator 47 of oscillation frequency $f_{m1}$ and source oscillator 48 for an oscillation frequency $f_{m2}$ for an initial training are provided and they are switched by a switch 49. Therefore, the dividing ratio of the frequency divider 46, may be determined as a value to change an oscillation frequency $f_{m1}$ to the transmission path rate fs. In this case, the oscillation frequency $f_{m2}$ is divided to a frequency fs−Δ(fs+Δ may be used). As the predetermined value ±Δ, for example, a value of 20% fs may be used. In this case, fs−=0.8 fs and the period t shown in FIG. 26B is 0.2T.

The operation of the embodiment shown in FIG. 28 is explained here.

The switch 49 is first switched to the position shown in FIG. 28 and the oscillation frequency $f_{m2}$ is frequency-divided by frequency divider 46 and the sampling frequency of 0.8 fs is provided to A/D converter 43.

A/D converter 43 performs a sampling of a received signal which is equalized by a line equalizer 42. Thus, a random sampling value $X_n$ is obtained. Power computation unit 44 obtains an average power E ($X_n^2$) based on sampling value Xn. The result obtained by this arithmetic operation is fed back to AGC circuit 45, which scans the received signal to provide the adaptive gain.

When the adaptive gain is obtained, AGC circuit 45 transmits a signal to switch 49 indicating completion of training, and switching it to the side of source oscillator 47.

Then, a sampling frequency equal to the transmission path rate $f_s$ is supplied to A/D converter 43 from the frequency divider 46. Thereafter, sampling is performed in accordance with the transmission path rate to conduct an automatic equalizing operation when the system is in communication.

The present invention may be applied to digital subscriber lines (cables) and so on. After the training is completed, analog waves need not be reproduced and sampling is conducted in accordance with the transmission path rate.

The embodiment shown in FIG. 28 realizes line equalizer 42 in an analog signal area but it may be provided after A/D converter 43. Then, after the received signal is converted to a digital signal, a line equalization may be conducted.

Figure 29:
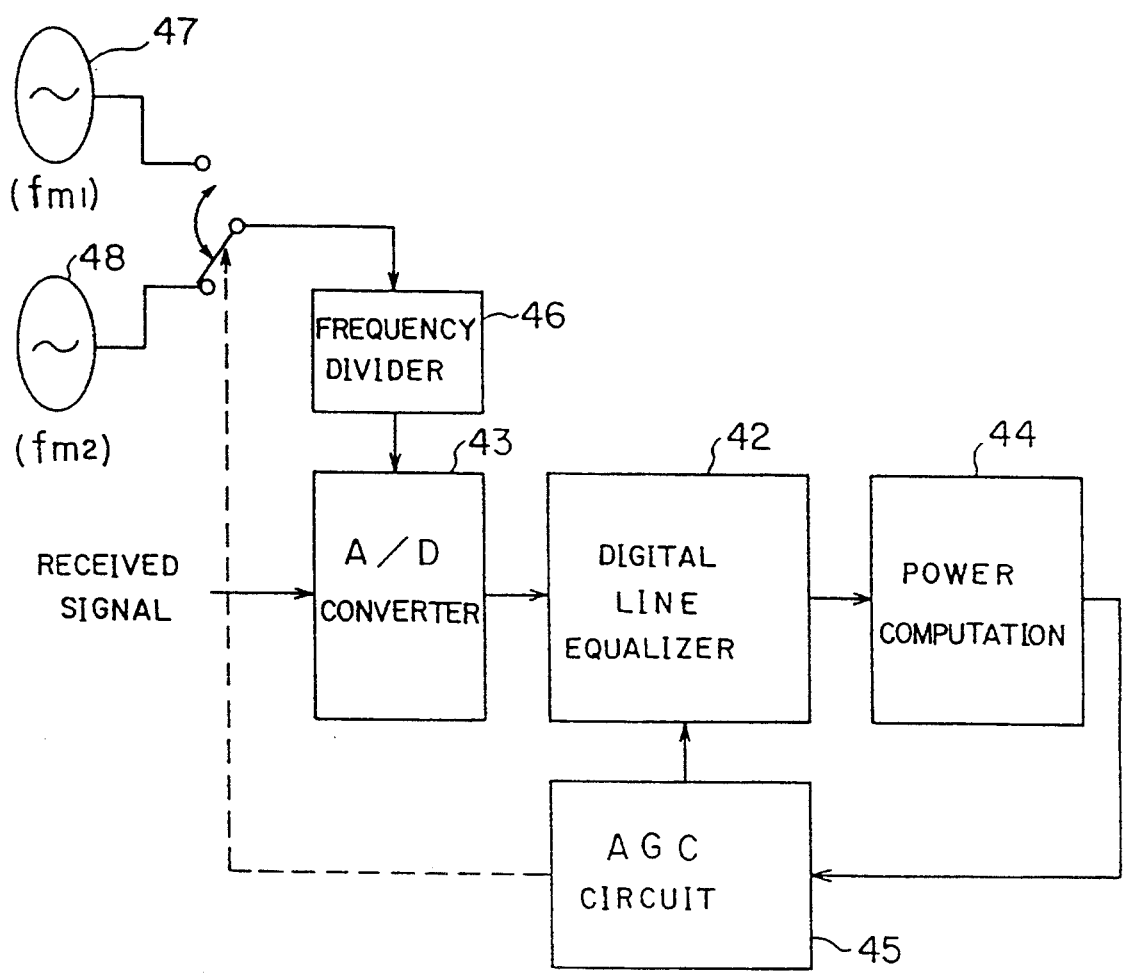
Figure 30:
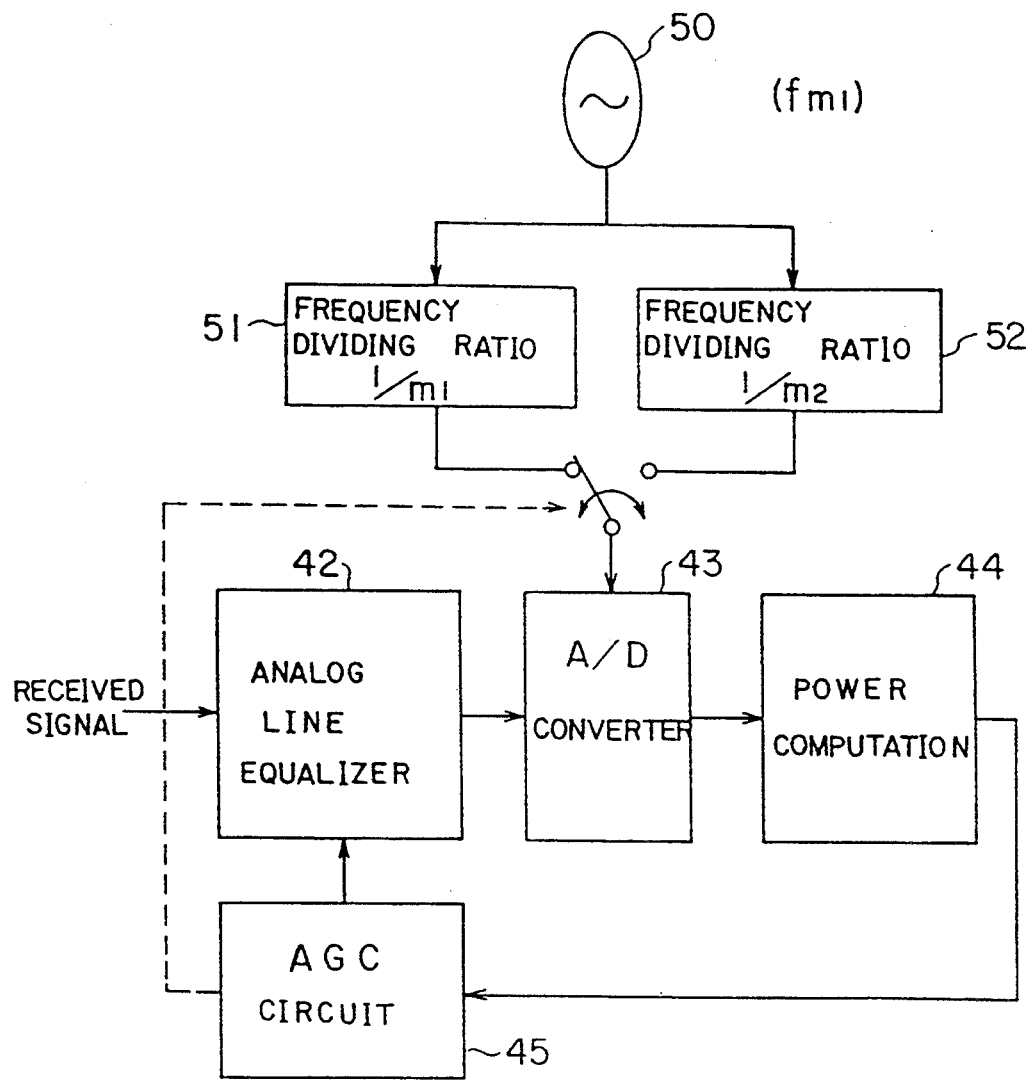

The embodiments shown in FIG. 28 and 29 use two oscillators, but only one oscillator 50 is used in the embodiment shown in FIG. 30. The oscillation frequency of the source oscillator 50 is applied to frequency dividers 51 and 52 which have respective ratios of frequency division of $1/f_{m}1$ and $2/f_{m}2$. Frequency dividers 51 and 52 produce respective sampling frequencies fs and fs-Δ, and the switch 53 is changed in accordance with a training completion signal from AGC circuit 45. It is possible to provide a switching function in a sampling frequency in the A/D converter.

As described above, the sampling method of the present invention enables the transmission rate to be shifted by a predetermined period upon training, to perform a sampling of the A/D converter equipped with the transmission apparatus. When the sampling is completed, the sampling frequency of the A/D converter is switched to the baud rate, namely, the transmission path rate. Therefore, the present invention meets the demand for operational speed of the A/D converter and enables it to be easily integrated in an LSI, thereby decreasing the cost of the apparatus.

What is claimed is:

1. An initial training apparatus for training a communication apparatus, comprising:
   an echo canceler, connectable to receive a training signal, producing a replica echo signal responsive to the training signal; and
   an automatic equalizer having a gain and operatively connectable to said echo canceler, said automatic equalizer including
      means for setting the gain to an initial gain;
      means for training said automatic equalizer to set the gain to an adaptive gain in dependence upon the training signal, and
      means for comparing the adaptive gain with the initial gain and for correcting the replica echo signal from said echo canceler responsive to the comparing by said means for comparing.

2. The initial training apparatus according to claim 1, wherein said echo canceler is operatively connected in series with said automatic equalizer.

3. An initial training apparatus for training a communication apparatus, comprising:
   an echo canceler, connectable to receive a training signal, producing a replica echo signal responsive to the training signal; and
   an automatic equalizer having a gain and operatively connected to said echo canceler, said automatic equalizer including
      means for setting the gain to an initial gain;
      means for training said automatic equalizer to set the gain to an adaptive gain in dependence upon the training signal;
      means for dividing the adaptive gain by the initial gain and for providing a result based on the dividing; and
      means for multiplying the echo replica signal by the result to correct the echo replica signal.

4. The initial training apparatus according to claim 3, wherein said echo canceler has a fixed gain equal to "1".

5. An initial training apparatus according to claim 3, further comprising means for setting the initial gain to a fixed value.

6. An initial training apparatus for training a communication apparatus, comprising:
   hybrid circuit means for transmitting a transmission signal and for receiving a first signal having a power;
   automatic equalizing means, operatively connected to said hybrid circuit means, for receiving an echo signal when said hybrid circuit means transmits the transmission signal and when said hybrid circuit receives the first signal, for obtaining a gain responsive to the power of the first signal, for providing an adaptive gain and for providing an output signal;
   echo cancelling means for receiving a transmission pulse and for producing an echo replica signal to minimize the residual echo signal and for outputting the echo replica signal after said communication apparatus has received the transmission pulse;
   gain correcting means for correcting a gain of said echo cancelling means based on the adaptive gain obtained by said automatic equalizing means; and
   subtracting means for forming an echo residual signal by obtaining a difference between the echo replica signal after the gain correction is applied to the echo replica signal and the output signal from said automatic equalizing means.

7. The initial training apparatus according to claim 5, wherein said gain correcting means comprises:
   means for determining an initial gain to be 1 before correction of the gain,
   calculating means for calculating a result based on a relation between an optimal gain and the initial gain, and
   means for applying the result to the echo replica signal.

8. The initial training apparatus according to claim 7, wherein said calculating means includes means for dividing the optimal gain by the initial gain.

9. The apparatus according to claim 6, wherein said automatic equalizing means comprises:
   line equalizer means for receiving the echo signal from said hybrid circuit and for providing a first output signal based on the echo signal and a variable gain;
   A/D converter operatively connected to said line equalizing means for providing the output signal after converting the first output signal;
   automatic gain control means for computing power of the output signal and for controlling the variable gain based on the computed power value; and
   switching means for selecting one of an initial gain and the adaptive gain.

10. The initial training apparatus according to claim 9, wherein said line equalizer means comprises:
    a coarse amplifier; and
    a fine amplifier for producing a gain to compensate for a line loss in a transmission line.

11. The initial training apparatus according to claim 9, wherein said automatic gain control means comprises:
    a plurality of switching elements;
    power computing means for determining a power of the output signal; and
    gain setting means, operatively connected to said switching elements, for providing a control signal which selects a connection status of said switching elements to set the variable gain of said line equalizer means according to the power determined by said power computing means.

12. The initial training apparatus according to claim 11, further comprising:
    a course amplifier having a gain; and
    a fine control amplifier having a gain, and wherein said gain setting means comprises:
    first decoder means for producing a coarse control code for setting the gain of said coarse amplifier based on the power determined by said power computing means, and
    second decoder means for producing a fine control code to set the gain of said fine control amplifier from the power determined by said power computing means.

13. The initial training apparatus according to claim 12, wherein said first and second decoder means comprise a ROM.

14. The initial training apparatus according to claim 9, wherein said automatic gain control means includes means for determining the variable gain from a table including a decibel value representing a difference between a predetermined target power and the power computed by said automatic gain control means.

15. The initial training apparatus according to claim 6, wherein said echo cancelling means comprises a transversal filter.

16. The initial training apparatus according to claim 6, wherein said echo cancelling means comprises
shift register means for setting a pattern of the transmission signal, and
memory means for outputting the echo replica signal in accordance with the pattern obtained from said shift registers means.

17. An initial training apparatus, comprising:
echo canceler means, connectable to receive a first signal, for producing a replica echo signal based on the first signal;
automatic equalizer means, having an initial gain and connectable to receive the first signal and for providing an adaptive gain based on the first signal and the initial gain;
means for dividing the adaptive gain by the initial gain;
gain correcting means for providing a ratio responsive to the dividing of the adaptive gain by the initial gain by said means for dividing; and
correction means for correcting the replica echo signal based on the ratio and the replica echo signal.

18. An initial training apparatus according to claim 17, wherein said correction means includes:
means for providing a multiplication result responsive to multiplying the replica echo signal by the ratio; and
means for subtracting an output signal from the multiplication result and outputting the result of the subtracting.

19. An initial training apparatus according to claim 17, further comprising:
hybrid circuit means for transmitting a transmitted signal, for receiving a second signal and for providing a residual echo signal after one of transmitting the transmitted signal and receiving the second signal.

20. An initial training apparatus according to claim 17, wherein said automatic equalizer means includes:
means for multiplying the residual echo signal by one of the initial gain and the optimal gain;
line equalizer means for providing an output signal responsive to an echo signal;
A/D converter means, responsive to the line equalizer means, for converting the output signal to a digital signal;
gain control means for calculating a power of the digital signal and for calculating the optimal gain based on the power; and
switching means for selectively providing one of the initial gain and the optimal gain.

21. An initial training apparatus according to claim 20, further comprising:
hybrid circuit means for transmitting a transmitted signal, for receiving a second signal and for providing an echo signal after one of transmitting the transmitted signal and receiving the second signal.

22. An initial training apparatus according to claim 17, further comprising:
switching means for selectively providing one of a predetermined value and the ratio.

23. An initial apparatus according to claim 22, wherein said correction means includes:
means for providing a multiplication result responsive to multiplying the replica echo signal by one of a gain equal to one and the ratio; and
means for subtracting an output from said automatic equalizer means from the multiplication result.

24. An initial training apparatus according to claim 17, wherein said automatic equalizer means includes:
amplifying means for amplifying one of the first and second signals responsive to a gain control code;
A/D converter means for converting the amplified one of the first and second signals to a digital signal;
power computation means for calculating a power of the digital signal; and
gain setting means for providing the gain control code to said amplifying means responsive to the power calculated by said power computation means.

25. An initial training apparatus according to claim 24, wherein said amplifying means includes:
a course slope gain amplifier; and
a fine flat gain amplifier.

26. An initial training apparatus according to claim 24, further including:
a low pass filter for filtering the digital signal to an equalized signal, and wherein
said power computer means includes means for determining power of the equalized signal.

27. An initial training apparatus according to claim 24, further including:
a plurality of switches, each having a plurality of states.

28. An initial training apparatus according to claim 32, wherein each of said switches has a plurality of states, and said gain setting means includes:
means for selecting one of the states of each of said switches.

29. An initial training apparatus according to claim 17, wherein said echo canceler means comprises a traversal filter.

30. An initial training apparatus according to claim 17, wherein said echo canceler means comprises:
shifting means for serially shifting the first signal by bits to produce an address; and
memory means for storing the replica echo signal corrected by said correcting means at the address provided by said shifting means.

31. An initial training apparatus according to claim 17, wherein said automatic equalizer means comprises:
line equalizing means for providing a first output signal by equalizing the first signal responsive to the appropriate gain;
oscillator means for providing an oscillation frequency equal to the transmission frequency;
frequency divider means for providing a sampling frequency responsive the oscillation frequency;
A/D converter means for providing a digital signal responsive to sampling the first output signal based on the sampling frequency;

power computation means for calculating an average power of the digital signal; and gain control means for determining an optimal gains responsive to the power.

32. An initial training method for correcting a replica echo signal produced by a transceiver having an initial gain, after transmitting a signal, comprising the steps of:

a) determining an initial gain of the transceiver after transmitting the signal;
b) performing an initial training of an echo canceler;
c) performing an initial training of an automatic gain control; and
d) correcting the replica echo signal produced by the echo canceler according to a gain of the automatic gain control and the initial gain.

* * * * *

UNITED STATES PATENT AND TRADEMARK OFFICE
CERTIFICATE OF CORRECTION

PATENT NO. : 5,353,305
DATED : October 4, 1994
INVENTOR(S) : Misao FUKUDA et al.

It is certified that error appears in the above-indentified patent and that said Letters Patent is hereby corrected as shown below:

Column 5, line 29, after "value" insert -- $\pm \Delta$ --.

Column 7, line 32, "FIGS." should be --apparatus,--.

Column 8, line 4, "apparatus." should be --apparatus,--.

Column 9, line 6, delete "for".

Column 10, line 52, "8," should be --7,--.

Column 15, line 42, "$G_F/G_I$is" should be --$G_F/G_I$ is--.

Column 16, line 2, "$G_F/G_I$is" should be --$G_F/G_I$ is--; and line 7, delete "tile".

Column 17, line 12, "freerunning" should be

--free-running--.

UNITED STATES PATENT AND TRADEMARK OFFICE
CERTIFICATE OF CORRECTION

PATENT NO. : 5,353,305
DATED : October 4, 1994
INVENTOR(S) : Misao Fukuda, et al.

It is certified that error appears in the above-indentified patent and that said Letters Patent is hereby corrected as shown below:

Column 21, line 14, after "comprises" insert --:--.

Signed and Sealed this

Twenty-eight Day of March, 1995

Attest:

BRUCE LEHMAN

Attesting Officer    Commissioner of Patents and Trademarks